(12) United States Patent
Tomotoshi

(10) Patent No.: US 10,853,020 B2
(45) Date of Patent: Dec. 1, 2020

(54) IMAGE SHARING METHOD, INFORMATION PROCESSING DEVICE, AND INFORMATION PROCESSING SYSTEM

(71) Applicant: SEIKO EPSON CORPORATION, Tokyo (JP)

(72) Inventor: Akio Tomotoshi, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/506,035

(22) Filed: Jul. 9, 2019

(65) Prior Publication Data

US 2020/0019369 A1    Jan. 16, 2020

(30) Foreign Application Priority Data

Jul. 10, 2018    (JP) ................................ 2018-131039

(51) Int. Cl.
| | | |
|---|---|---|
| *G06F 3/14* | (2006.01) | |
| *G09G 5/38* | (2006.01) | |
| *G06F 3/0354* | (2013.01) | |

(52) U.S. Cl.
CPC ............. *G06F 3/1454* (2013.01); *G09G 5/38* (2013.01); *G06F 3/03545* (2013.01); *G09G 2354/00* (2013.01); *G09G 2370/20* (2013.01)

(58) Field of Classification Search
CPC ........ G06F 21/62; G06F 21/84; G06F 3/1462; H04L 63/0407; H04L 63/06; H04L 63/104; H04L 65/403; H04W 12/02; G09G 2352/00; G09G 2358/00; G09G 2370/022; G09G 2370/04; G09G 2370/20
See application file for complete search history.

(56) References Cited

U.S. PATENT DOCUMENTS

| | | | | |
|---|---|---|---|---|
| 2010/0262925 | A1* | 10/2010 | Liu | ...................... H04L 65/1053 715/759 |
| 2015/0186095 | A1* | 7/2015 | Dong | .................... G06F 3/1454 345/2.1 |
| 2018/0121663 | A1* | 5/2018 | Hassan | ................... G06F 21/62 |

FOREIGN PATENT DOCUMENTS

JP      2015-43149 A      3/2015

\* cited by examiner

*Primary Examiner* — Nelson M Rosario
(74) *Attorney, Agent, or Firm* — Oliff PLC

(57) ABSTRACT

An image sharing method for sharing an image between a first information processing device and a second information processing device includes: when a first drawing is executed on a shared layer shared with the second information processing device, causing the first information processing device to transmit a first object generated by the first drawing to the second information processing device; when a second drawing is executed on an unshared layer not shared with the second information processing device, causing the first information processing device not to transmit a second object generated by the second drawing to the second information processing device; and causing the first information processing device to variably control one of a size and a position within the screen of the unshared layer, or both of the size and the position within the screen of the unshared layer.

12 Claims, 13 Drawing Sheets

IMAGE SHARING METHOD, INFORMATION PROCESSING DEVICE, AND INFORMATION PROCESSING SYSTEM

The present application is based on, and claims priority from JP Application Serial Number 2018-131039, filed Jul. 10, 2018, the disclosure of which is hereby incorporated by reference herein in its entirety.

BACKGROUND

1. Technical Field

The present disclosure relates to an image sharing method, an information processing device, and an information processing system.

2. Related Art

An electronic conference system in which a conference is held with an image shared among a plurality of terminal devices that are different from each other is known. In an electronic conference system of this type, a drawing can be performed at each terminal device and the content drawn at each terminal device can be shared among a plurality of terminal devices. JP-A-2015-43149 discloses an electronic conference system in which each terminal device can create a shared memo shared with another terminal device and an unshared memo not shared with another terminal device. For example, the shared memo and the unshared memo are managed on different layers from each other, and images or the like drawn in the shared memo and the unshared memo are displayed as superimposed on each other. Which of the shared memo and the unshared memo is used to accept a drawing is preset by a user operation.

Therefore, in the related-art electronic conference system, when drawing, at each terminal device, an image shared with another terminal device and an image not shared with another terminal device separately from each other, the user executes an operation to switch the memo to accept a drawing. Thus, usability such as user-friendliness drops.

SUMMARY

An image sharing method according to an aspect of the disclosure is an image sharing method for sharing an image between a first information processing device and a second information processing device, the method including: when a first drawing is executed on a shared layer shared with the second information processing device, causing the first information processing device to transmit a first object generated by the first drawing to the second information processing device and to display the first object at a position within a screen prescribed by the shared layer; when a second drawing is executed on an unshared layer not shared with the second information processing device, causing the first information processing device not to transmit a second object generated by the second drawing to the second information processing device and to display the second object at a position within the screen prescribed by the unshared layer; and causing the first information processing device to variably control one of a size and a position within the screen of the unshared layer, or both of the size and the position within the screen of the unshared layer.

An information processing device according to another aspect of the disclosure includes: a display control unit which, when a first drawing is executed on a shared layer shared with another information processing device, transmits a first object generated by the first drawing to the another information processing device and displays the first object at a position within a screen prescribed by the shared layer, and which, when a second drawing is executed on an unshared layer not shared with the another information processing device, does not transmit a second object generated by the second drawing to the another information processing device and displays the second object at a position within the screen prescribed by the unshared layer; and an arrangement control unit variably controlling one of a size and a position within the screen of the unshared layer, or both of the size and the position within the screen of the unshared layer.

An information processing system according to still another aspect of the disclosure is an information processing system for sharing an image between a first information processing device and a second information processing device. When a first drawing is executed on a shared layer shared with the second information processing device, the first information processing device transmits a first object generated by the first drawing to the second information processing device and displays the first object at a position within a screen prescribed by the shared layer. When a second drawing is executed on an unshared layer not shared with the second information processing device, the first information processing device does not transmit a second object generated by the second drawing to the second information processing device and displays the second object at a position within the screen prescribed by the unshared layer. The first information processing device variably controls one of a size and a position within the screen of the unshared layer, or both of the size and the position within the screen of the unshared layer.

DESCRIPTION OF EXEMPLARY EMBODIMENTS

Figure 1:
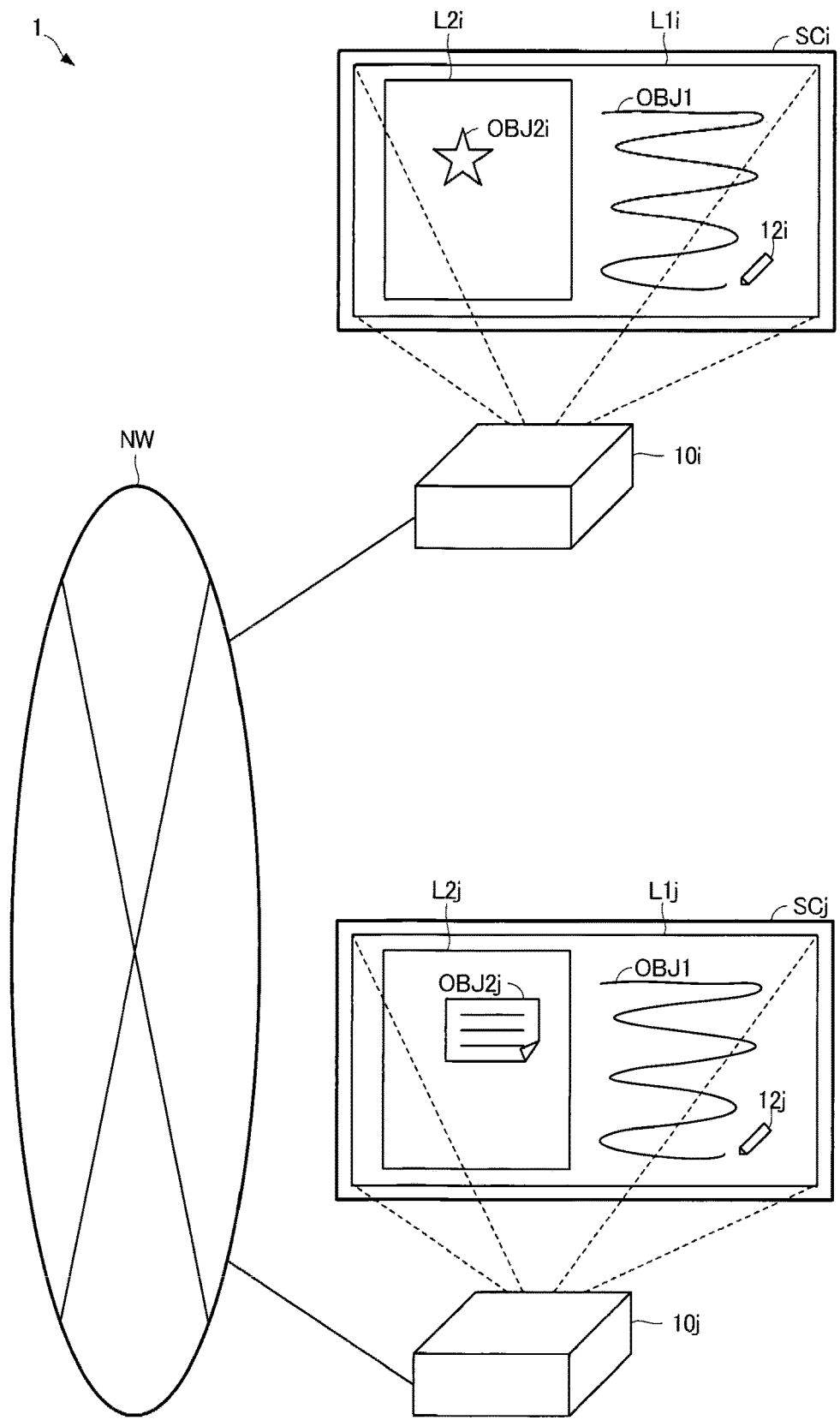
FIG. 1 is an explanatory view of an information processing system according to a first embodiment of the disclosure.

Hereinafter, embodiments will be described with reference to the drawings. In the drawings, the dimension and scale of each part are different from reality where appropriate. The embodiments include various technically preferable limitations. However, the scope of the disclosure is not limited to these embodiments.

First Embodiment

A first embodiment of the disclosure will now be described with reference to FIGS. 1 to 5. FIG. 1 is an explanatory view of an information processing system 1 according to the first embodiment of the disclosure. The information processing system 1 shown in FIG. 1 is used, for example, as an electronic conference system or the like, where an image is shared among a plurality of information processing devices 10i and 10j. For example, the information processing system 1 has the information processing devices 10i and 10j sharing an image, and a network NW. The network NW is, for example, a communication network such as the internet and LAN (local area network). One of the information processing devices 10i and 10j is an example of a first information processing device. The other of the information processing devices 10i and 10j is an example of a second information processing device. The information processing devices 10i and 10j have the same configuration or the like. Therefore, in the description below, the information processing device 10i is defined as the first information processing device, the information processing device 10j is defined as the second information processing device, and mainly the information processing device 10i is described. Also, when the information processing device 10i and the information processing device 10j need not be distinguished from each other, the information processing devices 10i and 10j are simply referred to as the information processing device 10. The number of information processing devices 10 is not limited to two.

Figure 2:
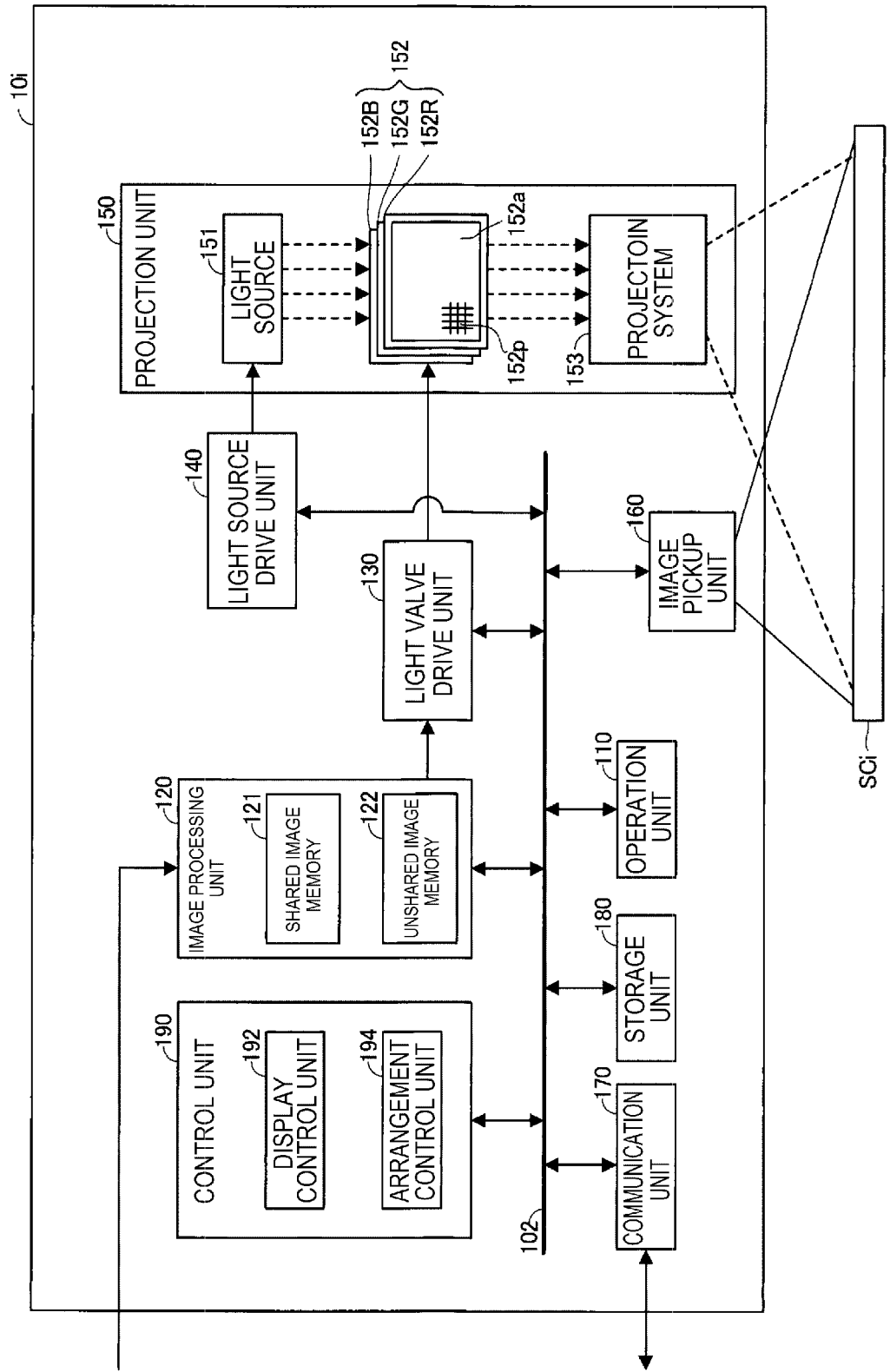
FIG. 2 is a block diagram showing the configuration of an information processing device according to the first embodiment.

The information processing device in this description includes a display device displaying an image. That is, a display device can be an example of the information processing device. The display device displaying an image includes a display unit displaying an image. A projector is an example of the display device. When a projector is employed as the display device, a projection unit 150 shown in FIG. 2 is equivalent to the display unit. Another example of the display device may be another display device described in modification example 8, described later.

The information processing device 10i is, for example, a projector displaying an image on a screen SCi. For example, the screen SCi is a projection screen. The screens SCi and SCj are not limited to the projection screen and can be changed according to need. For example, a wall may be used. An electronic pen 12i is attached to the information processing device 10i. The information processing device 10i displays a trajectory of the electronic pen 12i on the screen SCi, onto the screen SCi.

For example, when a drawing by the electronic pen 12i or the like is executed on a shared layer L1i shared with the information processing device 10j, the information processing device 10i displays a first object OBJ1 generated by the drawing, at a position within the screen SCi prescribed by the shared layer L1i. The information processing device 10i also transmits the first object OBJ1 generated by the drawing on the shared layer L1i to the information processing device 10j via the network NW. On receiving the first object OBJ1 from the information processing device 10i, the information processing device 10j displays the first object OBJ1 on the screen SCj. The number of first objects OBJ1 is not limited to one.

Meanwhile, when a drawing by the electronic pen 12i or the like is executed on an unshared layer L2i not shared with the information processing device 10j, the information processing device 10i displays a second object OBJ2i generated by the drawing, at a position within the screen SCi prescribed by the unshared layer L2i. The number of second objects OBJ2i is not limited to one.

The information processing device 10i does not transmit the second object OBJ2i generated by the drawing on the unshared layer L2i, to the information processing device 10j. Therefore, the second object OBJ2i generated by the drawing on the unshared layer L2i of the information processing device 10i is not displayed on the screen SCj used by the information processing device 10j. Similarly, a second object OBJ2j generated by a drawing on an unshared layer L2j of the information processing device 10j is not displayed on the screen SCi used by the information processing device 10i. The number of second objects OBJ2j is not limited to one.

Figure 3:
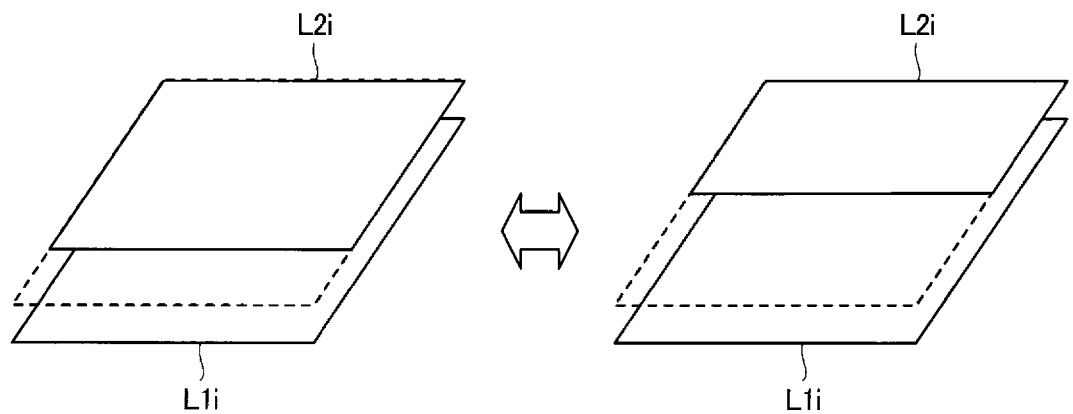
FIG. 3 is an explanatory view for explaining a shared layer and an unshared layer.

The size and the position within the screen SCi of the unshared layer L2i are variable, as shown in FIG. 3. That is, the information processing device 10i variably controls one of the size and the position within the screen SCi of the unshared layer L2i, or both of the size and the position within the screen SCi of the unshared layer L2i. The configuration of the information processing device 10i will now be described with reference to FIG. 2.

FIG. 2 is a block diagram showing the configuration of the information processing device 10i according to the first embodiment. The information processing device 10i has a bus 102, an operation unit 110, an image processing unit 120, a light valve drive unit 130, a light source drive unit 140, a projection unit 150, an image pickup unit 160, a communication unit 170, a storage unit 180, and a control unit 190. The projection unit 150 includes a light source 151, three liquid crystal light valves 152R, 152G, and 152B, and a projection system 153. Hereinafter, the three liquid crystal light valves 152R, 152G, and 152B may be collectively referred to as a liquid crystal light valve 152.

The operation unit 110, the image processing unit 120, the light valve drive unit 130, the light source drive unit 140, the image pickup unit 160, the communication unit 170, the storage unit 180, and the control unit 190 can communicate with each other via the bus 102.

The operation unit 110 is, for example, various operation buttons or operation keys, or a touch panel. The operation unit 110 receives an input operation by the user. The operation unit 110 may be a remote controller or the like which transmits information corresponding to an input operation by the user, via wireless or wired communication. When a remote controller is used as the operation unit 110, the information processing device 10i has a receiving unit which receives information transmitted from the remote controller. The remote controller has various operation buttons or operation keys or a touch panel to receive an input operation by the user.

The image processing unit 120 executes image processing on image information received from an image supply device such as a personal computer, not illustrated, image information generated by the control unit 190, image information received from the other information processing device 10*j*, or the like, and thus generates an image signal. The image information generated by the control unit 190 is image information generated by a drawing on the shared layer L1*i* and image information generated by a drawing on the unshared layer L2*i* or the like and represents a trajectory or the like of the electronic pen 12*i*. The image information received from the other information processing device 10*j* is image information generated by a drawing on a shared layer L1*j* executed by the other information processing device 10*j* or the like and represents a trajectory or the like of an electronic pen 12*j*.

The image processing unit 120 has, for example, a shared image memory 121 storing the image information generated by a drawing on the shared layer L1*i*, and an unshared image memory 122 storing the image information generated by a drawing on the unshared layer L2*i*. For example, the image processing unit 120 executes image processing on the image information stored in one of the shared image memory 121 and the unshared image memory 122 and thus generates an image signal. Alternatively, the image processing unit 120 executes image processing to combine together the image information stored in the shared image memory 121 and the image information stored in the unshared image memory 122 and thus generates an image signal. The image processing unit 120 then outputs the image signal to the light valve drive unit 130.

The shared image memory 121 and the unshared image memory 122 may be provided outside the image processing unit 120. For example, the shared image memory 121 and the unshared image memory 122 may be allocated to a part of a storage area provided in the storage unit 180.

The light valve drive unit 130 drives the liquid crystal light valve 152, based on the image signal generated by the image processing unit 120.

The light source drive unit 140 drives the light source 151. For example, the light source drive unit 140 causes the light source 151 to emit light when the operation unit 110 receives an operation to turn on the power.

The projection unit 150 projects a projection image onto the screen SCi. The light source 151 is, for example, a xenon lamp, ultra-high-pressure mercury lamp, LED (light-emitting diode), or laser light source or the like. The light emitted from the light source 151 is reduced in unevenness of luminance distribution by an optical integration system, not illustrated, and is subsequently separated into color light components of the primary colors of red, green, and blue by a color separation system, not illustrated. The color light components of red, green, and blue become incident on the corresponding liquid crystal light valves 152R, 152G, and 152B.

The liquid crystal light valve 152 is formed by a liquid crystal panel or the like made up of a pair of transparent substrates with a liquid crystal enclosed between them. The liquid crystal light valve 152 has a rectangular pixel area 152*a*. The pixel area 152*a* has a plurality of pixels 152*p* arranged into a matrix. The liquid crystal light valve 152 can apply a drive voltage to the liquid crystal at every pixel 152*p*. When the light valve drive unit 130 applies a drive voltage at each pixel 152*p* based on the image signal received from the image processing unit 120, each pixel 152*p* is set to a light transmittance based on the image signal. Therefore, the light emitted from the light source 151 is modulated by being transmitted through the pixel area 152*a* and thus forms an image based on the image signal for every color light component.

The images of the respective colors are combined together at every pixel 152*p* by a light combining system, not illustrated, and thus generate a projection image which is a color image. The projection image is projected in an enlarged form on the screen SCi by the projection system 153.

The image pickup unit 160 picks up an image of the screen SCi and generates picked-up image information representing the picked-up image. For example, the image pickup unit 160 has an optical system such as a lens, not illustrated, and an image pickup element, not illustrated, which converts the light condensed by the optical system into an electrical signal. The image pickup element is, for example, a CCD (charge-coupled device) image sensor or CMOS (complementary metal-oxide semiconductor) image sensor. The image pickup unit 160 repeatedly picks up an image of the screen SCi and thus generates picked-up image information in time series. Using the picked-up image information, the control unit 190 calculates a trajectory or the like of the electronic pen 12*i*.

The communication unit 170 communicates with the other information processing device 10*j* or the like, for example, via the network NW. The storage unit 180 is a computer-readable recording medium. For example, the storage unit 180 stores a program prescribing an operation of the information processing device 10*i*, and various kinds of information.

The control unit 190 is a computer such as a CPU (central processing unit) and controls an operation of the entirety of the information processing device 10*i*. The control unit 190 may have one or a plurality of processors. When a drawing by the electronic pen 12*i* or the like is executed on one of the shared layer L1*i* and the unshared layer L2*i*, the control unit 190 generates image information based on the drawing. The image information based on the drawing represents, for example, the first object OBJ1 and the second object OBJ2*i* in FIG. 1 drawn by the electronic pen 12*i*.

The control unit 190 also reads and executes the program stored in the storage unit 180 and thus implements the functions of a display control unit 192 and an arrangement control unit 194. That is, the information processing device 10*i* has the display control unit 192 and the arrangement control unit 194.

When a drawing is executed on the shared layer L1*i*, the display control unit 192 transmits the first object OBJ1 generated by the drawing to the other information processing device 10*j* and displays the first object OBJ1 at the position within the screen SCi prescribed by the shared layer L1*i*. For example, the display control unit 192 outputs image information of the first object OBJ1 generated by the drawing on the shared layer L1*i*, to the image processing unit 120. Consequently, the image processing unit 120 executes image processing on the image information of the first object OBJ1 received from the display control unit 192 and generates an image signal to display the first object OBJ1 on the screen SCi. Based on the image signal to display the first object OBJ1 on the screen SCi, the first object OBJ1 is displayed at the position within the screen SCi prescribed by the shared layer L1*i*.

Also, for example, the display control unit 192 transmits the image information of the first object OBJ1 generated by the drawing on the shared layer L1*i* to the other information processing device 10*j* via the communication unit 170 and the network NW. Consequently, the first object OBJ1 is displayed on the screen SCj used by the information processing device 10*j*. The position of the first object OBJ1 displayed on the screen SCj is the position within the screen SCj prescribed by the shared layer L1*j* corresponding to the shared layer L1*i*.

Meanwhile, when a drawing is executed on the unshared layer L2*i*, the display control unit 192 does not transmit the second object OBJ2*i* generated by the drawing to the other information processing device 10*j* and displays the second object OBJ2*i* at the position within the screen SCi prescribed by the unshared layer L2*i*. For example, the display control unit 192 outputs image information of the second object OBJ2*i* generated by the drawing on the unshared layer L2*i*, to the image processing unit 120. Consequently, the image processing unit 120 executes image processing on the image information of the second object OBJ2*i* received from the display control unit 192 and generates an image signal to display the second object OBJ2*i* on the screen SCi. Based on the image signal to display the second object OBJ2*i* on the screen SCi, the second object OBJ2*i* is displayed at the position within the screen SCi prescribed by the unshared layer L2*i*. The second object OBJ2*i* is not transmitted to the information processing device 10*j* and therefore is not displayed on the screen SCj used by the information processing device 10*j*.

The arrangement control unit 194 variably controls one of the size and the position within the screen SCi of the unshared layer L2*i*, or both of the size and the position within the screen SCi of the unshared layer L2*i*. The shared layer L1*i* and the unshared layer L2*i* will now be described with reference to FIG. 3.

FIG. 3 is an explanatory view for explaining the shared layer L1*i* and the unshared layer L2*i*. The range prescribed by the shared layer L1*i* corresponds to a maximum range where a drawing can be carried out. The unshared layer L2*i* overlaps the shared layer L1*i* within the screen SCi. The size and the position within the screen SCi of the unshared layer L2*i* are variably controlled. Consequently, in the information processing device 10*i*, the shared layer L1*i* can have a part not overlapping the unshared layer L2*i* within the screen SCi. For example, a drawing in a part not overlapping the unshared layer L2*i*, of the range prescribed by the shared layer L1*i*, is a drawing on the shared layer L1*i*.

That is, when a drawing is executed in an area not overlapping the area prescribed by the unshared layer L2*i*, of the area within the screen SCi prescribed by the shared layer L1*i*, the information processing device 10*i* transmits the first object OBJ1 generated by the drawing to the information processing device 10*j*. Consequently, the first object OBJ1 is displayed on the screens SCi and SCj.

Meanwhile, when a drawing is executed in the area within the screen SCi prescribed by the unshared layer L2*i*, the information processing device 10*i* displays the second object OBJ2*i* generated by the drawing, onto the screen SCi as a drawing on the unshared layer L2*i*. That is, the information processing device 10*i* regards a drawing in the overlapping part within the screen SCi of the shared layer L1*i* and the unshared layer L2*i* as a drawing on the unshared layer L2*i*. Therefore, at the information processing device 10*i*, an image shared with the information processing device 10*j* and an image not shared with the information processing device 10*j* can be easily drawn separately from each other.

The dashed lines in FIG. 3 indicate the unshared layer L2*i* when the unshared layer L2*i* has the same size and position within the screen SCi as in the shared layer L1*i*. In this case, the shared layer L1*i* does not have a part that does not overlap the unshared layer L2*i* within the screen SCi. Therefore, at the related-art information processing device, where the unshared layer has the same size and position within the screen as in the shared layer and where the size or the like of the unshared layer is fixed, an image shared with another information processing device and an image not shared with another information processing device cannot be easily drawn separately from each other. In contrast, in the information processing device 10*i*, the unshared layer L2*i* has a different size and position within the screen SCi from the shared layer L1*i*. Therefore, at the information processing device 10*i*, an image shared with the other information processing device 10*j* and an image not shared with the information processing device 10*j* can be easily drawn separately from each other.

Figure 4:
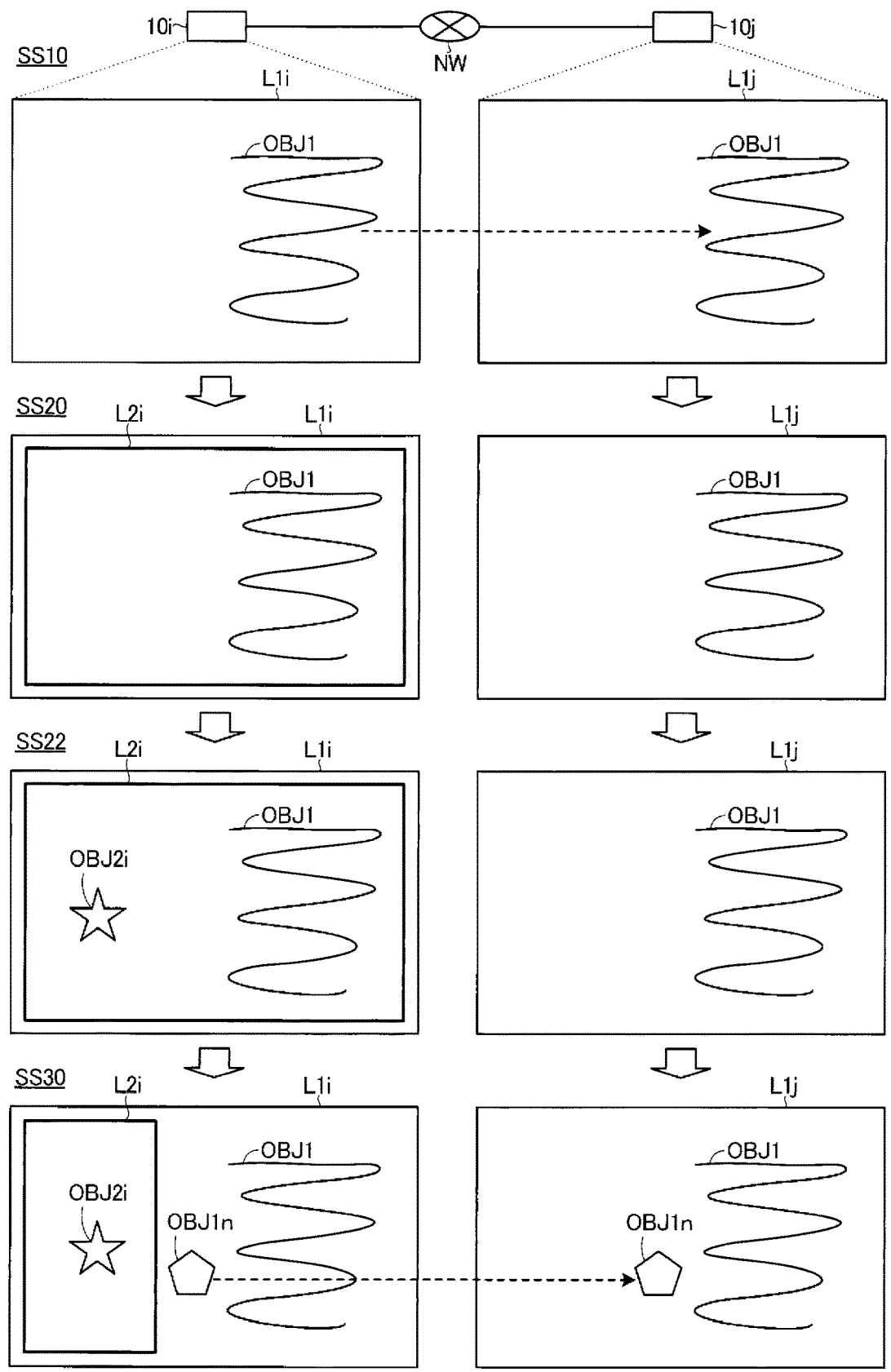
FIG. 4 is an explanatory view for explaining an operation of the information processing system according to the first embodiment.

FIG. 4 is an explanatory view for explaining an operation of the information processing system 1 according to the first embodiment. The operation shown in FIG. 4 is an example of an image sharing method for sharing an image between the first information processing device and the second information processing device. In FIG. 4, the screens SCi and SCj are omitted in order to make the illustration easy to view.

In step SS10, the unshared layer L2*i* of the information processing device 10*i* and the unshared layer L2*j* of the information processing device 10*j* are hidden. When a drawing is executed on the shared layer L1*i*, the information processing device 10*i* displays the first object OBJ1 generated by the drawing, at the position within the screen SCi prescribed by the shared layer L1*i*. Also, when the drawing is executed on the shared layer L1*i*, the information processing device 10*i* transmits the first object OBJ1 generated by the drawing, to the information processing device 10*j*. That is, the first object OBJ1 drawn on the shared layer L1*i* of the information processing device 10*i* is transferred to the information processing device 10*j* and drawn on the shared layer L1*j* of the information processing device 10*j*. The information processing device 10*j* displays the first object OBJ1 received from the information processing device 10*i*, at the position within the screen SCj prescribed by the shared layer L1*j*.

In step SS20, for example, an operation button to switch between showing and hiding of the unshared layer L2*i* is pressed and an object to identify the range prescribed by the unshared layer L2*i* is displayed. In the example shown in FIG. 4, a rectangular frame showing the range of the unshared layer L2*i* of substantially the same size as in the shared layer L1*i* is displayed on the screen SCi. The information processing device 10*i* variably controls one of the size and the position within the screen SCi of the unshared layer L2*i*, or both of the size and the position within the screen SCi of the unshared layer L2*i*, as shown in step SS30.

In step SS22, the second object OBJ2*i* is drawn on the unshared layer L2*i*. Consequently, the second object OBJ2*i* is displayed on the screen SCi. The second object OBJ2*i* drawn on the unshared layer L2*i* is not transferred to the information processing device 10*j* and therefore is not displayed on the screen SCj used by the information processing device 10*j*. That is, when a drawing is executed on the unshared layer L2*i*, the information processing device 10*i* does not transmit the second object OBJ2*i* generated by the drawing, to the information processing device 10*j*, and displays the second object OBJ2$i$ at the position within the screen SCi prescribed by the unshared layer L2$i$.

In step SS30, the size of the unshared layer L2$i$ is changed and a first object OBJ1$n$ is newly drawn in a part not overlapping the unshared layer L2$i$ within the screen SCi of the shared layer L1$i$. The first object OBJ1$n$ newly drawn on the shared layer L1$i$ is transferred to the information processing device 10$j$ and drawn on the shared layer L1$j$. The change in the size of the unshared layer L2$i$ or the like is implemented, for example, by selecting and moving a side of the rectangular frame showing the range of the unshared layer L2$i$, with the electronic pen 12$i$. Hereinafter, the first object OBJ1$n$ may be simply referred to as the first object OBJ1 when it is not distinguished from another first object OBJ1 or the like.

In the state shown in step SS30, the information processing device 10$i$ processes a drawing in the range of the unshared layer L2$i$ within the screen SCi, as a drawing on the unshared layer L2$i$. Therefore, in the state shown in step SS30, the position to draw at is distinguished and thus an image shared with the other information processing device 10$j$ and an image not shared with the information processing device 10$j$ can be easily drawn separately from each other.

Meanwhile, when a drawing is executed on the shared layer L1$j$, the information processing device 10$j$ similarly transmits the first object OBJ1 generated by the drawing, to the other information processing device 10$i$, and displays the first object OBJ1 at the position within the screen SCj prescribed by the shared layer L1$j$. When a drawing is executed on the unshared layer L2$j$, the information processing device 10$j$ does not transmit the second object OBJ2$j$ generated by the drawing, to the other information processing device 10$i$, and displays the second object OBJ2$j$ at the position within the screen SCj prescribed by the unshared layer L2$j$.

Figure 5:
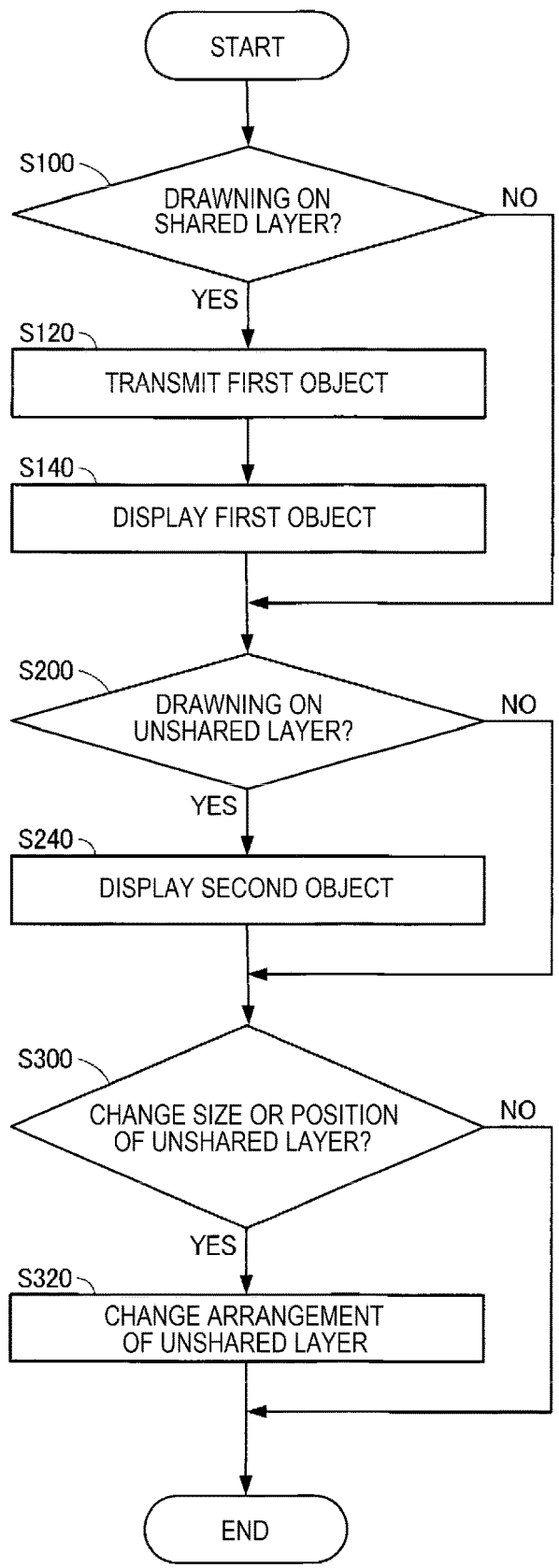
FIG. 5 is a flowchart showing an example of an operation of the information processing device according to the first embodiment.

FIG. 5 is a flowchart showing an example of an operation of the information processing device 10$i$ according to the first embodiment. The operation shown in FIG. 5 is an example of an image sharing method for sharing an image between the first information processing device and the second information processing device.

In step S100, the control unit 190 of the information processing device 10$i$ determines whether a drawing is executed on the shared layer L1$i$ or not. That is, the control unit 190 determines whether the content drawn on the shared layer L1$i$ is updated or not. When a drawing is executed on the shared layer L1$i$, the operation of the information processing device 10$i$ shifts to step S120. Meanwhile, when a drawing is not executed on the shared layer L1$i$, the operation of the information processing device 10$i$ shifts to step S200.

In step S120, the display control unit 192 of the information processing device 10$i$ transmits the first object OBJ1 generated by the drawing on the shared layer L1$i$, to the other information processing device 10$j$ via the communication unit 170 and the network NW.

Next, in step S140, the display control unit 192 of the information processing device 10$i$ displays the first object OBJ1 generated by the drawing on the shared layer L1$i$, at the position within the screen SCi prescribed by the shared layer L1$i$. That is, when a drawing is executed on the shared layer L1$i$, the display control unit 192 of the information processing device 10$i$ transmits the first object OBJ1 generated by the drawing, to the information processing device 10$j$, and displays the first object OBJ1 at the position within the screen SCi prescribed by the shared layer L1$i$.

In step S200, the control unit 190 of the information processing device 10$i$ determines whether a drawing is executed on the unshared layer L2$i$ or not. That is, the control unit 190 determines whether the content drawn on the unshared layer L2$i$ is updated or not. When a drawing is executed on the unshared layer L2$i$, the operation of the information processing device 10$i$ shifts to step S240. Meanwhile, when a drawing is not executed on the unshared layer L2$i$, the operation of the information processing device 10$i$ shifts to step S300.

Next, in step S240, the display control unit 192 of the information processing device 10$i$ displays the second object OBJ2$i$ generated by the drawing on the unshared layer L2$i$, at the position within the screen SCi prescribed by the unshared layer L2$i$. That is, when a drawing is executed on the unshared layer L2$i$, the display control unit 192 of the information processing device 10$i$ does not transmit the second object OBJ2$i$ generated by the drawing, to the information processing device 10$j$, and displays the second object OBJ2$i$ at the position within the screen SCi prescribed by the unshared layer L2$i$.

In step S300, the arrangement control unit 194 of the information processing device 10$i$ determines whether the size or the position within the screen SCi of the unshared layer L2$i$ is to be changed or not. For example, the arrangement control unit 194 determines whether a change instruction to change the size or the position within the screen SCi of the unshared layer L2$i$ is accepted or not. When the size or the position within the screen SCi of the unshared layer L2$i$ is to be changed, the operation of the information processing device 10$i$ shifts to step S320. Meanwhile, when neither the size nor the position within the screen SCi of the unshared layer L2$i$ is to be changed, the information processing device 10$i$ ends the operation sequence without changing the size or the like of the unshared layer L2$i$.

In step S320, the arrangement control unit 194 of the information processing device 10$i$ changes the arrangement of the unshared layer L2$i$. For example, when a change instruction to change the size of the unshared layer L2$i$ is accepted, the arrangement control unit 194 changes the size of the unshared layer L2$i$, based on the change instruction. Alternatively, when a change instruction to change the position within the screen SCi of the unshared layer L2$i$ is accepted, the arrangement control unit 194 changes the position within the screen SCi of the unshared layer L2$i$, based on the change instruction. Also, when a change instruction to change the size and the position within the screen SCi of the unshared layer L2$i$ is accepted, the arrangement control unit 194 changes the size and the position within the screen SCi of the unshared layer L2$i$, based on the change instruction.

The operation of the information processing device 10$i$ is not limited to the example shown in FIG. 5. For example, the series of processes in steps S100, S120, and S140 may be executed after the series of processes in step S200 and S240 or may be executed after the series of processes in steps S300 and S320. The series of processes in steps S300 and S320 may be executed before the series of processes in steps S100, S120, and S140 or may be executed before the series of processes in steps S200 and S240. Alternatively, the series of processes in steps S100, S120, and S140, the series of processes in steps S200 and S240, and the series of processes in steps S300 and S320 may be executed in parallel.

As described above, in the first embodiment, when a drawing is executed on the shared layer L1$i$ shared with the information processing device 10$j$, the information processing device 10$i$ transmits the first object OBJ1 generated by the drawing, to the information processing device 10j, and displays the first object OBJ1 at the position within the screen SCi prescribed by the shared layer L1i. When a drawing is executed on the unshared layer L2i not shared with the information processing device 10j, the information processing device 10i does not transmit the second object OBJ2i generated by the drawing, to the information processing device 10j, and displays the second object OBJ2i at the position within the screen SCi prescribed by the unshared layer L2i.

The information processing device 10i variably controls one of the size and the position within the screen SCi of the unshared layer L2i or both of the size and the position within the screen SCi of the unshared layer L2i. For example, the information processing device 10i adjusts the size or the position within the screen SCi of the unshared layer L2i in response to an operation by the user, and secures a part of the shared layer L1i that does not overlap the unshared layer L2i within the screen SCi. The user can draw, distinguishing the area not overlapping the unshared layer L2i, of the area of the shared layer L1i within the screen SCi, and the area of the unshared layer L2i within the screen SCi, and thus can easily draw an image shared with the information processing device 10j and an image not shared with the information processing device 10j, separately from each other. That is, at the information processing device 10i, an image shared with the other information processing device 10j and an image not shared with the information processing device 10j can be easily drawn separately from each other. Thus, the information processing system 1, where an image is shared between the information processing devices 10i and 10j, can improve usability such as user-friendliness.

Second Embodiment

A major difference between a second embodiment and the first embodiment is that the control unit 190 also functions as a copy control unit 196. The information processing system according to the second embodiment is the same as the information processing system 1 according to the first embodiment except for having an information processing device 10A instead of the information processing device 10 in FIG. 1. In the second embodiment, as in the first embodiment, "i" or "j" is added to the end of the reference sign of the information processing device 10A when distinguishing two information processing devices 10A. For example, an information processing device 10Ai is defined as a first information processing device and an information processing device 10Aj is defined as a second information processing device, and an image sharing method for sharing an image between the first information processing device and the second information processing device is described.

Figure 6:
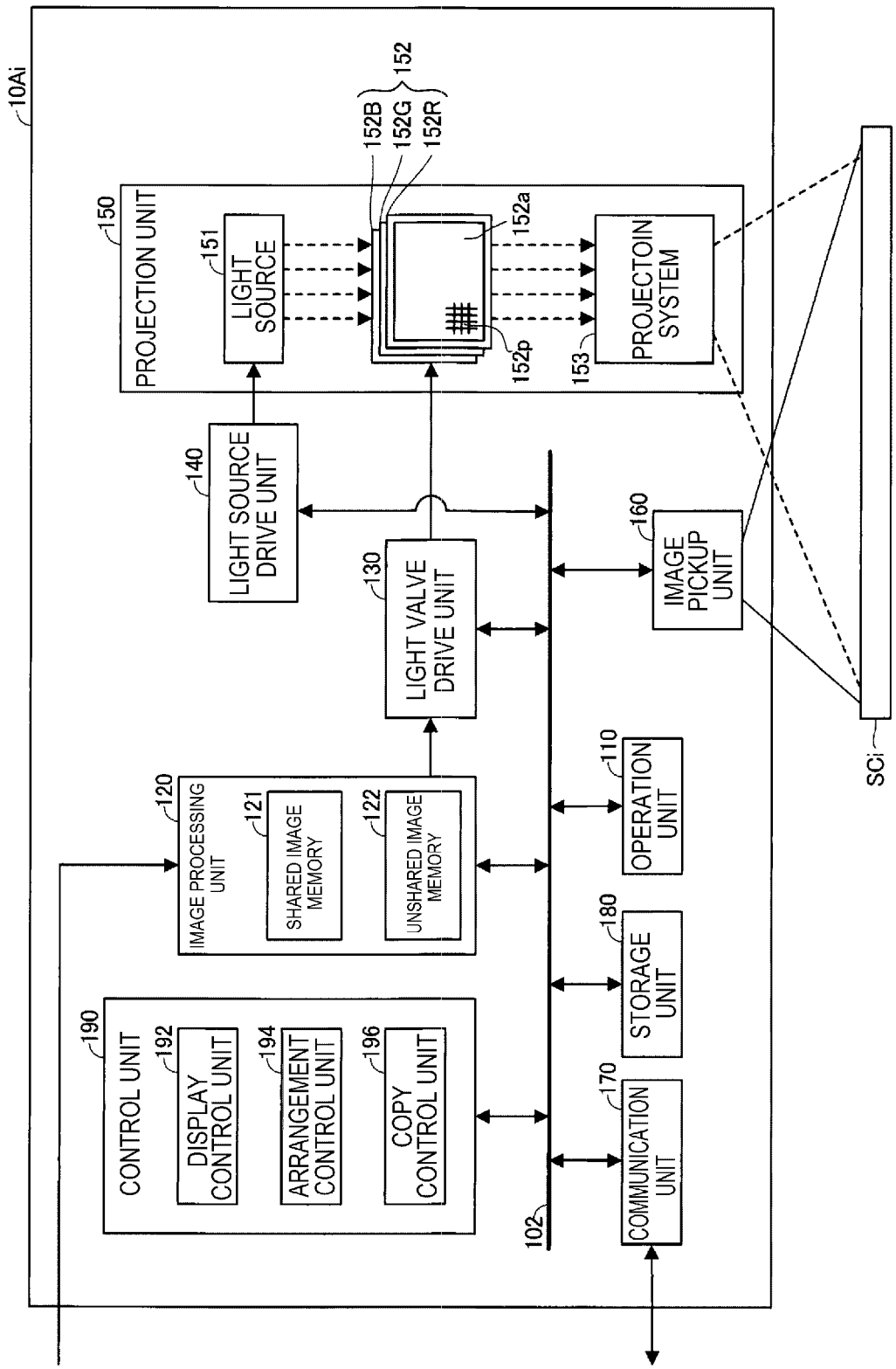
FIG. 6 is a block diagram showing the configuration of an information processing device according to a second embodiment.

FIG. 6 is a block diagram showing the configuration of the information processing device 10Ai according to the second embodiment. The same elements as the elements already described with reference to FIGS. 1 to 5 are denoted by the same reference signs and are not described further in detail. The configuration of the information processing device 10Ai is the same as the configuration of the information processing device 10i of the first embodiment. For example, the information processing device 10Ai has a bus 102, an operation unit 110, an image processing unit 120, a light valve drive unit 130, a light source drive unit 140, a projection unit 150, an image pickup unit 160, a communication unit 170, a storage unit 180, and a control unit 190.

The bus 102, the operation unit 110, the image processing unit 120, the light valve drive unit 130, the light source drive unit 140, the projection unit 150, the image pickup unit 160, the communication unit 170, the storage unit 180, and the control unit 190 are the same as in the first embodiment. However, the program executed by the control unit 190, for example, the program stored in the storage unit 180, is different from that in the first embodiment. For example, the control unit 190 reads and executes the program stored in the storage unit 180 and thus implements the functions of a display control unit 192, an arrangement control unit 194, and a copy control unit 196. That is, the information processing device 10Ai has the display control unit 192, the arrangement control unit 194, and the copy control unit 196.

On accepting a copy instruction to copy the second object OBJ2i included in the unshared layer L2i onto the shared layer L1i, the copy control unit 196 of the information processing device 10Ai copies the second object OBJ2i designated by the copy instruction onto the shared layer L1i. Consequently, the display control unit 192 of the information processing device 10Ai displays the second object OBJ2i copied onto the shared layer L1i, at the position within the screen SCi prescribed by the shared layer L1i.

Since the content drawn on the shared layer L1i is updated by the copying, the display control unit 192 of the information processing device 10Ai transmits the second object OBJ2i copied onto the shared layer L1i, to the other information processing device 10Aj. That is, on accepting a copy instruction to copy the second object OBJ2i included in the unshared layer L2i onto the shared layer L1i, the information processing device 10Ai copies the second object OBJ2i designated by the copy instruction onto the shared layer L1i. The information processing device 10Ai then transmits the second object OBJ2i copied onto the shared layer L1i, to the information processing device 10Aj. An operation of the information processing device 10Ai will now be described with reference to FIG. 7.

Figure 7:
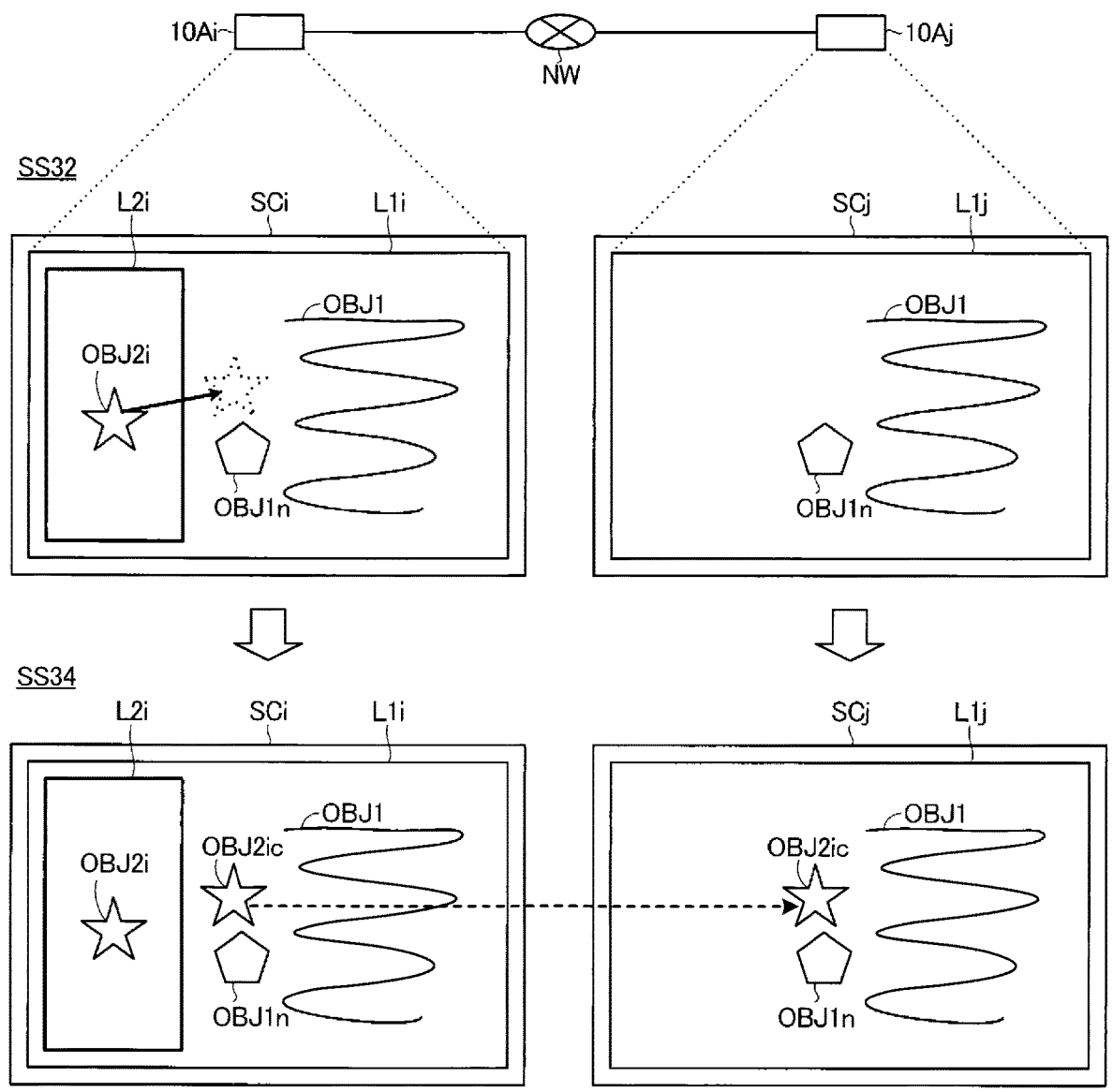
FIG. 7 is an explanatory view for explaining an operation of the information processing device according to the second embodiment.

FIG. 7 is an explanatory view for explaining an operation of the information processing device 10Ai according to the second embodiment. The operation shown in FIG. 7 is an example of an image sharing method for sharing an image between the first information processing device and the second information processing device.

In step SS32, based on a copy instruction to copy the second object OBJ2i drawn on the unshared layer L2i onto the shared layer L1i, the copy control unit 196 of the information processing device 10Ai copies the second object OBJ2i onto the shared layer L1i. For example, the user of the information processing device 10Ai drags and drops the second object OBJ2i as a copy target, from the unshared layer L2i to the shared layer L1i, using the electronic pen 12i. Thus, the second object OBJ2i as a copy target is copied to the drop destination.

Next, in step SS34, the display control unit 192 of the information processing device 10Ai displays a second object OBJ2ic, which is a copy of the second object OBJ2i, at the position within the screen SCi prescribed by the shared layer L1i. The display control unit 192 of the information processing device 10Ai also transmits the second object OBJ2ic to the information processing device 10Aj. Consequently, the second object OBJ2ic is drawn on the shared layer L1j of the information processing device 10Aj and displayed at the position within the screen SCj prescribed by the shared layer L1j.

That is, on accepting a copy instruction, the information processing device 10Ai copies the second object OBJ2i designated by the copy instruction onto the shared layer L1i and transmits the second object OBJ2i copied onto the shared layer L1i, to the information processing device 10Aj.

Therefore, the user of the information processing device 10Ai can copy the second object OBJ2$i$ not shared with the information processing device 10Aj onto the shared layer L1$i$ and thus can easily share the content of the second object OBJ2$i$ with the user of the information processing device 10Aj.

As described above, the second embodiment can achieve an effect similar to that of the first embodiment. In the second embodiment, on accepting a copy instruction to copy the second object OBJ2$i$ included in the unshared layer L2$i$ onto the shared layer L1$i$, the information processing device 10Ai copies the second object OBJ2$i$ designated by the copy instruction onto the shared layer L1$i$. The information processing device 10Ai then transmits the second object OBJ2$i$ copied onto the shared layer L1$i$, to the information processing device 10Aj. Thus, the information processing device 10Ai can easily share, with the information processing device 10Aj, the content of the second object OBJ2$i$ not shared with the information processing device 10Aj, and thus can improve usability such as user-friendliness.

Third Embodiment

A major difference between a third embodiment and the second embodiment is that the control unit 190 functions as a display control unit 192B instead of the display control unit 192 in FIG. 6. The information processing system 1 according to the third embodiment is the same as the information processing system 1 according to the first embodiment except for having an information processing device 10B instead of the information processing device 10 in FIG. 1. In the third embodiment, as in the first embodiment, "i" or "j" is added to the end of the reference sign of the information processing device 10B when distinguishing two information processing devices 10B. For example, an information processing device 10Bi is defined as a first information processing device and an information processing device 10Bj is defined as a second information processing device, and an image sharing method for sharing an image between the first information processing device and the second information processing device is described.

Figure 8:
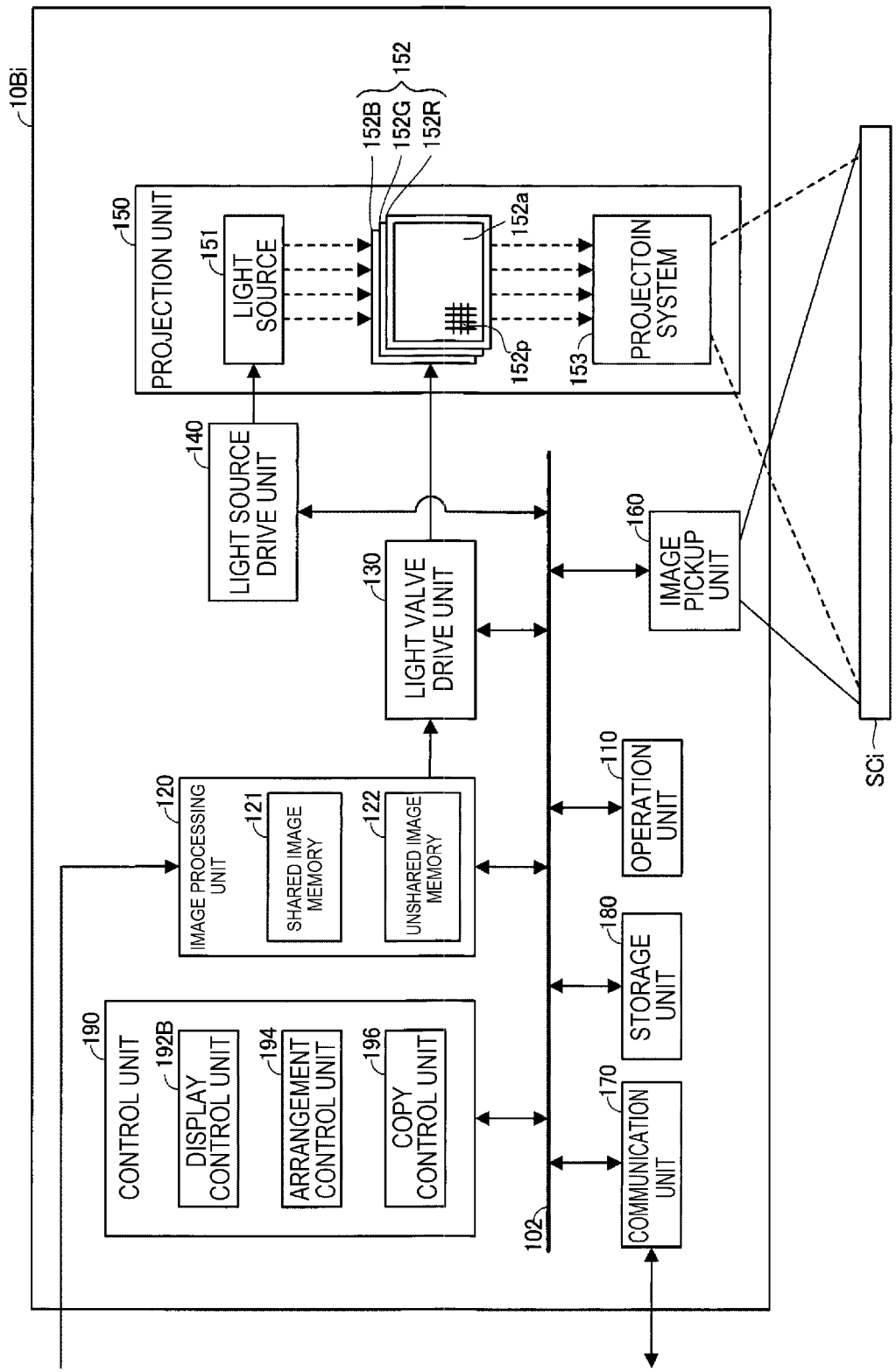
FIG. 8 is a block diagram showing the configuration of an information processing device according to a third embodiment.

FIG. 8 is a block diagram showing the configuration of the information processing device 10Bi according to the third embodiment. The same elements as the elements already described with reference to FIGS. 1 to 7 are denoted by the same reference signs and are not described further in detail. The configuration of the information processing device 10Bi is the same as the configuration of the information processing device 10Ai of the second embodiment. For example, the information processing device 10Bi has a bus 102, an operation unit 110, an image processing unit 120, a light valve drive unit 130, a light source drive unit 140, a projection unit 150, an image pickup unit 160, a communication unit 170, a storage unit 180, and a control unit 190.

The bus 102, the operation unit 110, the image processing unit 120, the light valve drive unit 130, the light source drive unit 140, the projection unit 150, the image pickup unit 160, the communication unit 170, the storage unit 180, and the control unit 190 are the same as in the second embodiment. However, the program executed by the control unit 190, for example, the program stored in the storage unit 180, is different from that in the second embodiment. For example, the control unit 190 reads and executes the program stored in the storage unit 180 and thus implements the functions of a display control unit 192B, an arrangement control unit 194, and a copy control unit 196. That is, the information processing device 10Bi has the display control unit 192B, the arrangement control unit 194, and the copy control unit 196.

The display control unit 192B of the information processing device 10Bi is the same as the display control unit 192 in FIG. 6 except for displaying on the screen SCi an object to identify a range prescribed by a layer not shared with the information processing device 10Bi in the other information processing device 10Bj.

For example, the display control unit 192B of the information processing device 10Bi receives image information to identify the range prescribed by the unshared layer L2$j$ of the information processing device 10Bj, from the information processing device 10Bj via the communication unit 170. The display control unit 192B of the information processing device 10Bi then transfers the image information to identify the range prescribed by the unshared layer L2$j$ of the information processing device 10Bj, to the image processing unit 120. Thus, the object to identify the range prescribed by the layer not shared with the information processing device 10Bi in the information processing device 10Bj is displayed on the screen SCi. An operation of the information processing device 10Bi will now be described with reference to FIG. 9.

Figure 9:
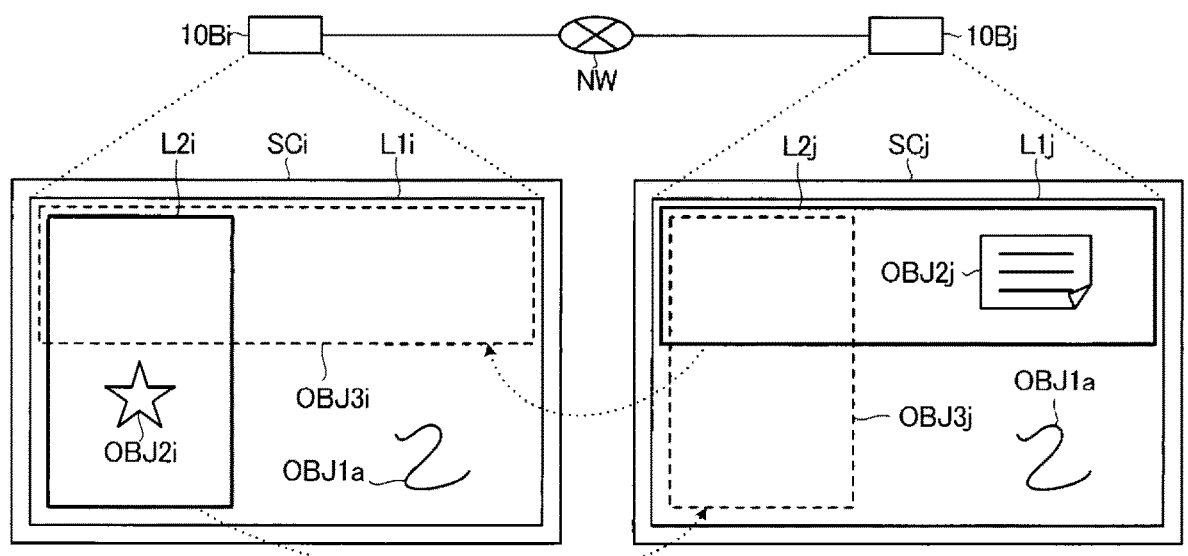
FIG. 9 is an explanatory view for explaining an operation of the information processing device according to the third embodiment.

FIG. 9 is an explanatory view for explaining an operation of the information processing device 10Bi according to the third embodiment. The operation shown in FIG. 9 is an example of an image sharing method for sharing an image between the first information processing device and the second information processing device.

For example, the information processing device 10Bi receives an object OBJ3$i$ to identify the range prescribed by the unshared layer L2$j$ of the information processing device 10Bj, from the information processing device 10Bj. The information processing device 10Bi then displays the object OBJ3$i$ received from the information processing device 10Bj, at the position within the screen SCi corresponding to the unshared layer L2$j$ of the information processing device 10Bj. In the example shown in FIG. 9, the object OBJ3$i$ to identify the range prescribed by the unshared layer L2$j$ of the information processing device 10Bj is a dashed-line frame showing the range prescribed by the unshared layer L2$j$ of the information processing device 10Bj.

That is, the information processing device 10Bi displays, on the screen SCi, the object OBJ3$i$ to identify the range prescribed by the unshared layer L2$j$ not shared with the information processing device 10Bi in the information processing device 10Bj. Thus, the range prescribed by the unshared layer L2$j$ of the information processing device 10Bj is visibly displayed on the screen SCi used by the information processing device 10Bi. Similarly, the information processing device 10Bj displays, on the screen SCj, an object OBJ3$j$ to identify the range prescribed by the unshared layer L2$i$ not shared with the information processing device 10Bj in the information processing device 10Bi.

Since the range prescribed by the unshared layer L2$j$ of the information processing device 10Bj is visibly displayed on the screen SCi used by the information processing device 10Bi, the user of the information processing device 10Bi can easily identify the range within the screen SCi of the unshared layer L2$j$ of the information processing device 10Bj. Therefore, the user of the information processing device 10Bi can draw an image or the like shared with the information processing device 10Bj, avoiding the part corresponding to the unshared layer L2$j$ of the information processing device 10Bj. Thus, in the third embodiment, the first object OBJ1$a$ and the second object OBJ2$j$ displayed on the screen SCj used by the information processing device 10Bj can be restrained from overlapping each other and thus becoming less visible. Similarly, in the third embodiment, the first object OBJ1a and the second object OBJ2i displayed on the screen SCi used by the information processing device 10Bi can be restrained from overlapping each other and thus becoming less visible.

The object OBJ3i to identify the range prescribed by the unshared layer L2j of the information processing device 10Bj is not limited to a dashed-line frame. For example, the object OBJ3i to identify the range prescribed by the unshared layer L2j of the information processing device 10Bj may be four marks respectively indicating positions corresponding to the four corners of the unshared layer L2j.

As described above, the third embodiment can achieve an effect similar to that of the first embodiment and the second embodiment. Also, in the third embodiment, the information processing device 10Bi displays, on the screen SCi, the object OBJ3i to identify the range prescribed by the unshared layer L2j not shared with the information processing device 10Bi in the information processing device 10Bj. Therefore, at the information processing device 10Bi, an image or the like shared with the information processing device 10Bj can be drawn, avoiding the part corresponding to the unshared layer L2j of the information processing device 10Bj. Thus, the first object OBJ1a and the second object OBJ2j displayed on the screen SCj used by the information processing device 10Bj can be restrained from overlapping each other and thus becoming less visible.

Fourth Embodiment

A major difference between a fourth embodiment and the second embodiment is that the control unit 190 functions as a display control unit 192C instead of the display control unit 192 in FIG. 6. The information processing system 1 according to the fourth embodiment is the same as the information processing system 1 according to the first embodiment except for having an information processing device 10C instead of the information processing device 10 in FIG. 1. In the fourth embodiment, as in the first embodiment, "i" or "j" is added to the end of the reference sign of the information processing device 10C when distinguishing two information processing devices 10C. For example, an information processing device 10Ci is defined as a first information processing device and an information processing device 10Cj is defined as a second information processing device, and an image sharing method for sharing an image between the first information processing device and the second information processing device is described.

Figure 10:
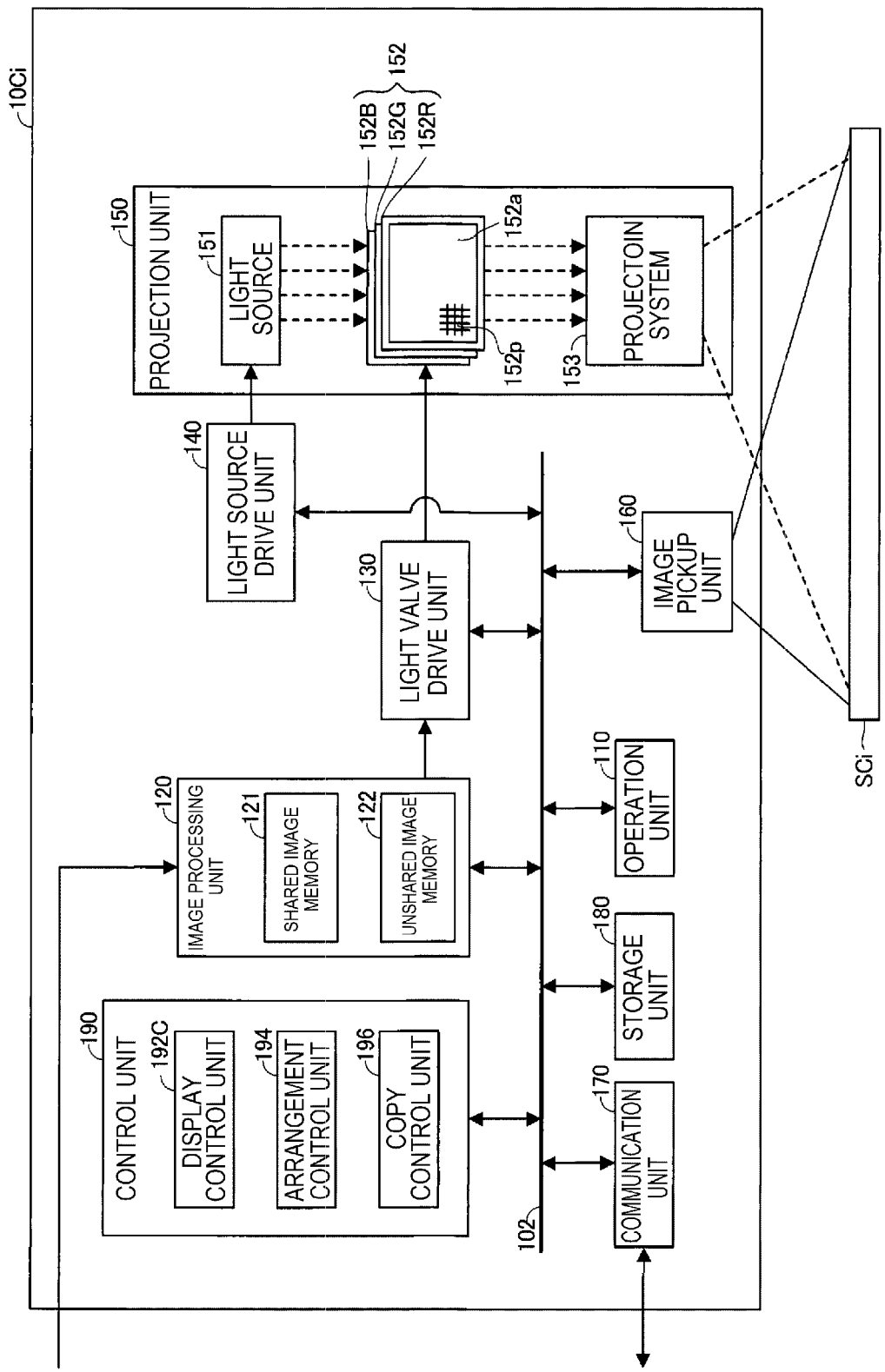
FIG. 10 is a block diagram showing the configuration of an information processing device according to a fourth embodiment.

FIG. 10 is a block diagram showing the configuration of the information processing device 10Ci according to the fourth embodiment. The same elements as the elements already described with reference to FIGS. 1 to 9 are denoted by the same reference signs and are not described further in detail. The configuration of the information processing device 10Ci is the same as the configuration of the information processing device 10Ai of the second embodiment. For example, the information processing device 10Ci has a bus 102, an operation unit 110, an image processing unit 120, a light valve drive unit 130, a light source drive unit 140, a projection unit 150, an image pickup unit 160, a communication unit 170, a storage unit 180, and a control unit 190.

The bus 102, the operation unit 110, the image processing unit 120, the light valve drive unit 130, the light source drive unit 140, the projection unit 150, the image pickup unit 160, the communication unit 170, the storage unit 180, and the control unit 190 are the same as in the second embodiment. However, the program executed by the control unit 190, for example, the program stored in the storage unit 180, is different from that in the second embodiment. For example, the control unit 190 reads and executes the program stored in the storage unit 180 and thus implements the functions of a display control unit 192C, an arrangement control unit 194, and a copy control unit 196. That is, the information processing device 10Ci has the display control unit 192C, the arrangement control unit 194, and the copy control unit 196.

When the display control unit 192C accepts a first display instruction to select showing or hiding the shared layer L1i, the display control unit 192C of the information processing device 10Ci shows or hides the first object OBJ1, based on the first display instruction. Meanwhile, when the display control unit 192C accepts a second display instruction to show or hide the unshared layer L2i, the display control unit 192C of the information processing device 10Ci shows or hides the second object OBJ2i, based on the second display instruction. Other operations of the display control unit 192C are the same as those of the display control unit 192 in FIG. 6. An operation of the information processing device 10Ci will now be described with reference to FIG. 11.

Figure 11:
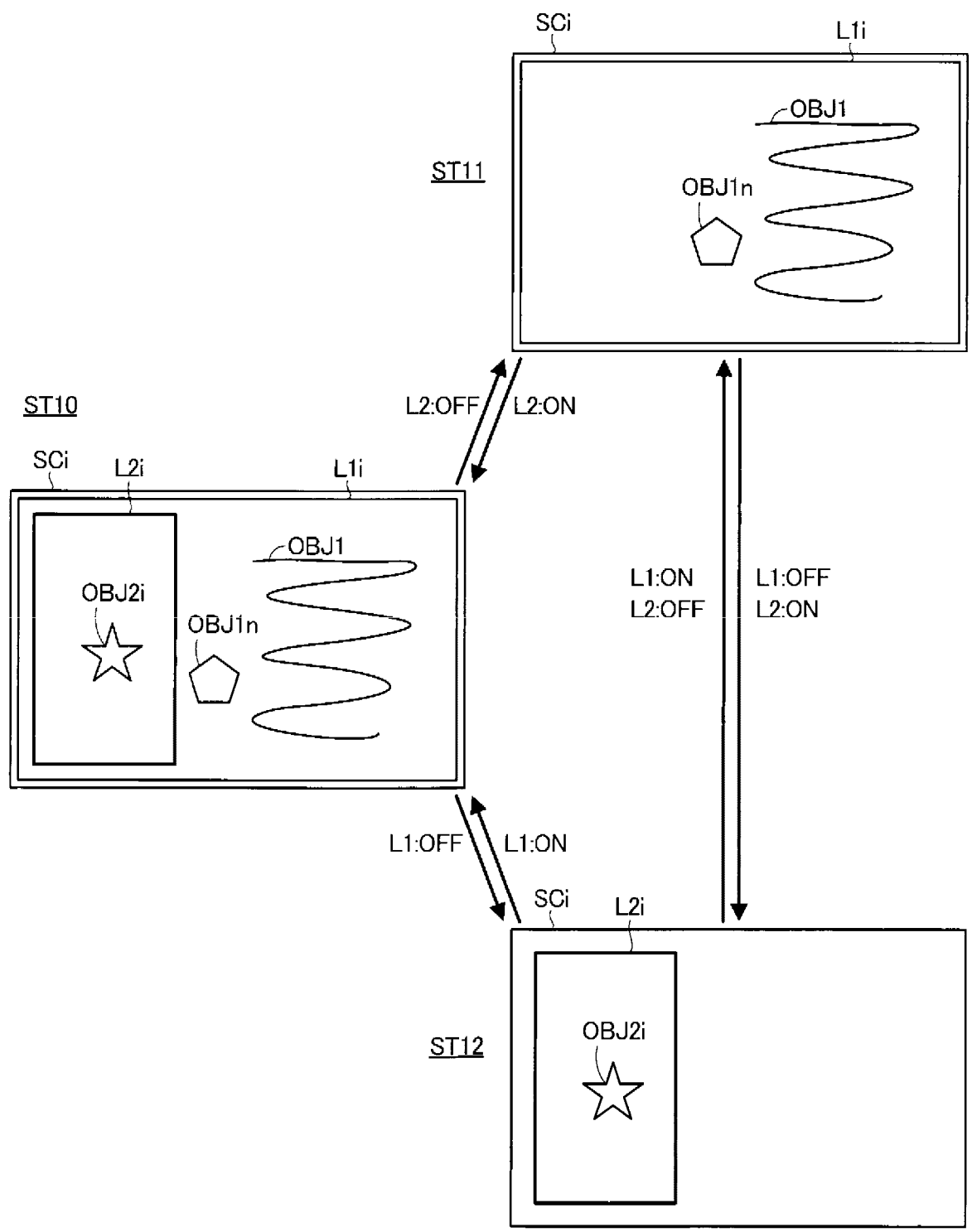
FIG. 11 is an explanatory view for explaining an operation of the information processing device according to the fourth embodiment.

FIG. 11 is an explanatory view for explaining an operation of the information processing device 10Ci according to the fourth embodiment. The operation shown in FIG. 11 is an example of an image sharing method for sharing an image between the first information processing device and the second information processing device. FIG. 11 shows the display state of the screen SCi used by the information processing device 10Ci. In the example shown in FIG. 11, the illustration of a display state where neither the first objects OBJ1 and OBJ1n drawn on the shared layer L1i nor the second object OBJ2i drawn on the unshared layer L2i is displayed on the screen SCi is omitted.

In a display state ST10, the display control unit 192C displays, on the screen SCi, the first objects OBJ1 and OBJ1n drawn on the shared layer L1i and the second object OBJ2i drawn on the unshared layer L2i.

When the display control unit 192C accepts a first display instruction to select to hide the shared layer L1i in the display state ST10, the display control unit 192C hides the first objects OBJ1 and OBJ1n, based on the first display instruction. Consequently, the display state of the screen SCi shifts from the display state ST10 to a display state ST12. Meanwhile, when the display control unit 192C accepts a second display instruction to select to hide the unshared layer L2i in the display state ST10, the display control unit 192C hides the second object OBJ2i, based on the second display instruction. Consequently, the display state of the screen SCi shifts from the display state ST10 to a display state ST11.

Also, when the display control unit 192C accepts a first display instruction to select to hide the shared layer L1i and a second display instruction to select to show the unshared layer L2i in the display state ST11, the display control unit 192C hides the first objects OBJ1 and OBJ1n and shows the second object OBJ2i on the screen SCi. Consequently, the display state of the screen SCi shifts from the display state ST11 to the display state ST12.

Meanwhile, when the display control unit 192C accepts a second display instruction to select to show the unshared layer L2i in the display state ST11, the display control unit 192C shows the second object OBJ2i on the screen SCi.

Consequently, the display state of the screen SCi shifts from the display state ST11 to the display state ST10.

Also, when the display control unit 192C accepts a first display instruction to select to show the shared layer L1i and a second display instruction to select to hide the unshared layer L2i in the display state ST12, the display control unit 192C shows the first objects OBJ1 and OBJ1n on the screen SCi and hides the second object OBJ2i. Consequently, the display state of the screen SCi shifts from the display state ST12 to the display state ST11.

Meanwhile, when the display control unit 192C accepts a first display instruction to select to show the shared layer L1i in the display state ST12, the display control unit 192C shows the first objects OBJ1 and OBJ1n on the screen SCi. Thus, the display state of the screen SCi shifts from the display state ST12 to the display state ST10. Also, when the display control unit 192C accepts a first display instruction to select to hide the shared layer L1i and a second display instruction to select to hide the unshared layer L2i, the display control unit 192C hides the first objects OBJ1 and OBJ1n and the second object OBJ2i. In this case, neither the first objects OBJ1 and OBJ1n nor the second object OBJ2i is displayed on the screen SCi.

The information processing device 10Ci can selectively display the first objects OBJ1 and OBJ1n and the second object OBJ2i on the screen SCi. Therefore, for example, when the first objects OBJ1 and OBJ1n and the second object OBJ2i displayed on the screen SCi overlap each other and become less visible, either the first objects OBJ1 and OBJ1n or the second object OBJ2i can be hidden to make the screen SCi easier to view.

The shared layer L1i and the unshared layer L2i do not accept any drawing when a selection to hide these layers is made. Therefore, the user can operate the operation unit 110 to select to hide the unshared layer L2i and thus can execute a drawing on the shared layer L1i at an overlapping part within the screen SCi between the shared layer L1i and the unshared layer L2i.

As described above, the fourth embodiment can achieve an effect similar to that of the first embodiment and the second embodiment. Also, in the fourth embodiment, when the information processing device 10Ci accepts a first display instruction to select to show or hide the shared layer L1i, the information processing device 10Ci shows or hides the first object OBJ1, based on the first display instruction. Meanwhile, when the information processing device 10Ci accepts a second display instruction to select to show or hide the unshared layer L2i, the information processing device 10Ci shows or hides the second object OBJ2i, based on the second display instruction.

Since the information processing device 10Ci can selectively display the first object OBJ1 and the second object OBJ2i on the screen SCi, the screen SCi can become easier to view. In the information processing device 10Ci, the shared layer L1i and the unshared layer L2i do not accept any drawing when a selection to hide these layers is made. Therefore, in the information processing device 10Ci, hiding the unshared layer L2i allows the shared layer L1i to accept a drawing even at an overlapping part within the screen SCi between the shared layer L1i and the unshared layer L2i.

Fifth Embodiment

A major difference between a fifth embodiment and the second embodiment is that the control unit 190 also functions as a drawing control unit 198. The information processing system 1 according to the fifth embodiment is the same as the information processing system 1 according to the first embodiment except for having an information processing device 10D instead of the information processing device 10 in FIG. 1. In the fifth embodiment, as in the first embodiment, "i" or "j" is added to the end of the reference sign of the information processing device 10D when distinguishing two information processing devices 10D. For example, an information processing device 10Di is defined as a first information processing device and an information processing device 10Dj is defined as a second information processing device, and an image sharing method for sharing an image between the first information processing device and the second information processing device is described.

Figure 12:
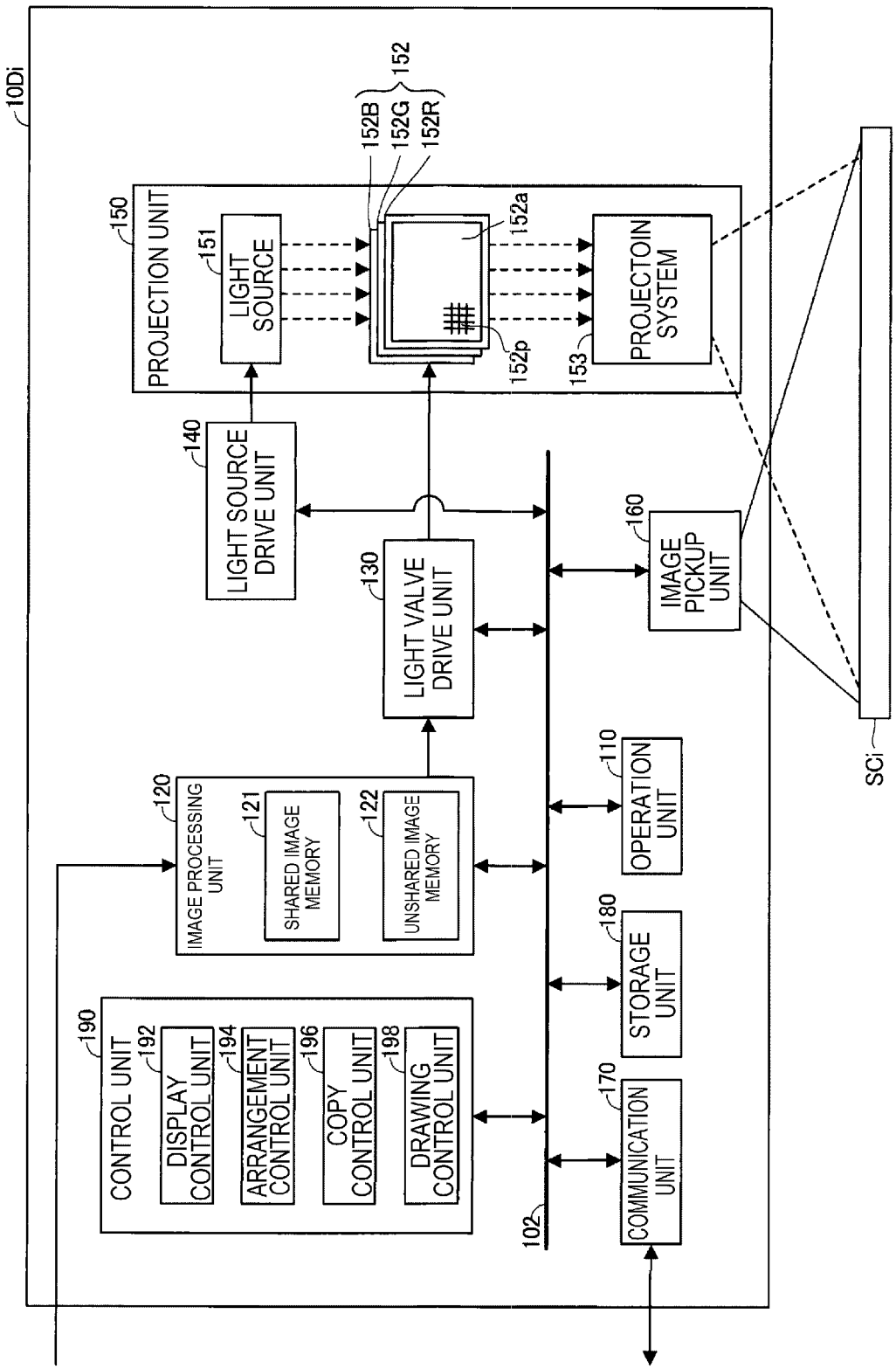
FIG. 12 is a block diagram showing the configuration of an information processing device according to a fifth embodiment.

FIG. 12 is a block diagram showing the configuration of the information processing device 10Di according to the fifth embodiment. The same elements as the elements already described with reference to FIGS. 1 to 11 are denoted by the same reference signs and are not described further in detail. The configuration of the information processing device 10Di is the same as the configuration of the information processing device 10Ai of the second embodiment. For example, the information processing device 10Di has a bus 102, an operation unit 110, an image processing unit 120, a light valve drive unit 130, a light source drive unit 140, a projection unit 150, an image pickup unit 160, a communication unit 170, a storage unit 180, and a control unit 190.

The bus 102, the operation unit 110, the image processing unit 120, the light valve drive unit 130, the light source drive unit 140, the projection unit 150, the image pickup unit 160, the communication unit 170, the storage unit 180, and the control unit 190 are the same as in the second embodiment. However, the program executed by the control unit 190, for example, the program stored in the storage unit 180, is different from that in the second embodiment. For example, the control unit 190 reads and executes the program stored in the storage unit 180 and thus implements the functions of a display control unit 192, an arrangement control unit 194, a copy control unit 196, and a drawing control unit 198. That is, the information processing device 10Di has the display control unit 192, the arrangement control unit 194, the copy control unit 196, and the drawing control unit 198.

When the drawing control unit 198 accepts a selection instruction to select which of the shared layer L1i and the unshared layer L2i is used to accept a drawing at an overlapping part within the screen SCi between the shared layer L1i and the unshared layer L2i, the drawing control unit 198 accepts a drawing at the overlapping part on one of the shared layer L1i and the unshared layer L2i, based on the selection instruction.

For example, when the shared layer L1i is selected by a selection instruction, the drawing control unit 198 accepts a drawing at the overlapping part within the screen SCi between the shared layer L1i and the unshared layer L2i, as a drawing on the shared layer L1i. In this case, when a drawing is executed at the overlapping part within the screen SCi between the shared layer L1i and the unshared layer L2i, the display control unit 192 transmits the first object OBJ1 generated by the drawing, to the information processing device 10Dj. Consequently, the first object OBJ1 is displayed on the screens SCi and SCj.

Meanwhile, for example, when the unshared layer L2i is selected by a selection instruction, the drawing control unit 198 accepts a drawing at the overlapping part within the screen SCi between the shared layer L1i and the unshared layer L2i, as a drawing on the unshared layer L2i. In this case, when a drawing is executed at the overlapping part within the screen SCi between the shared layer L1i and the unshared layer L2i, the display control unit 192 does not transmit the second object OBJ2i generated by the drawing, to the information processing device 10Dj, and displays the second object OBJ2i on the screen SCi. An operation of the information processing device 10Di will now be described with reference to FIG. 13.

Figure 13:
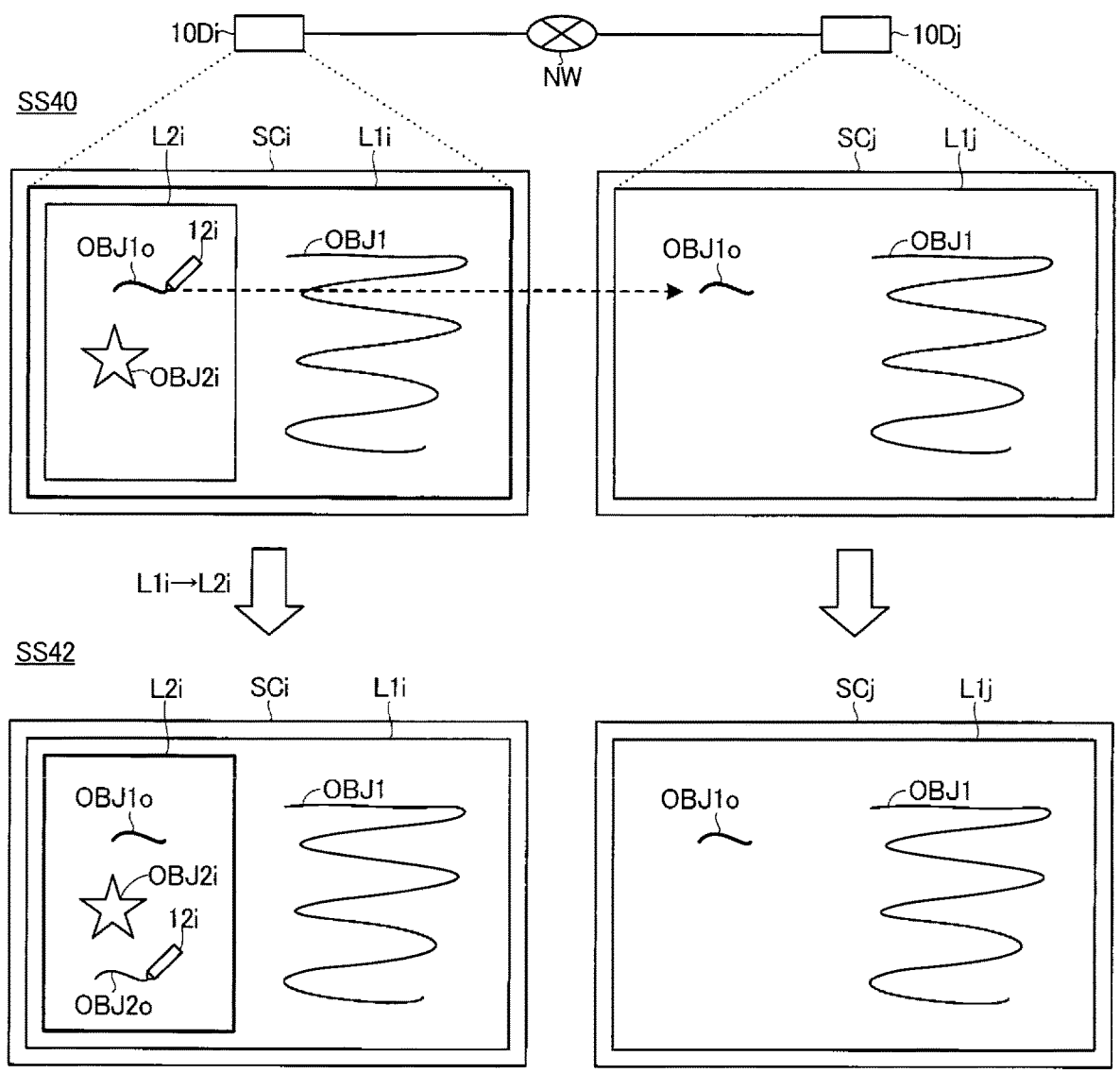
FIG. 13 is an explanatory view for explaining an operation of the information processing device according to the fifth embodiment.

FIG. 13 is an explanatory view for explaining an operation of the information processing device 10Di according to the fifth embodiment. The operation shown in FIG. 13 is an example of an image sharing method for sharing an image between the first information processing device and the second information processing device.

In step SS40, the shared layer L1i is selected by a selection instruction. Therefore, the information processing device 10Di accepts, on the shared layer L1i, a drawing at the overlapping part within the screen SCi between the shared layer L1i and the unshared layer L2i. Thus, when a drawing is executed at the overlapping part within the screen SCi between the shared layer L1i and the unshared layer L2i, the information processing device 10Di displays a first object OBJ1o generated by the drawing, at the position within the screen SCi prescribed by the shared layer L1i. The information processing device 10Di also transmits the first object OBJ1o generated by the drawing at the overlapping part, to the information processing device 10Dj. Consequently, the first object OBJ1o is displayed at the position within the screen SCj prescribed by the shared layer L1j.

Next, in step SS42, the information processing device 10Di accepts a selection instruction to accept, on the unshared layer L2i, a drawing at the overlapping part within the screen SCi between the shared layer L1i and the unshared layer L2i. Thus, the information processing device 10Di accepts, on the unshared layer L2i, a drawing at the overlapping part within the screen SCi between the shared layer L1i and the unshared layer L2i. Therefore, when a drawing is executed at the overlapping part within the screen SCi between the shared layer L1i and the unshared layer L2i, the information processing device 10Di does not transmit a second object OBJ2o generated by the drawing, to the information processing device 10Dj, and displays the second object OBJ2o at the position within the screen SCi prescribed by the unshared layer L2i.

When a drawing is executed in an area other than the overlapping part with the unshared layer L2i, of the area within the screen SCi prescribed by the shared layer L1i, the information processing device 10Di processes the drawing as a drawing on the shared layer L1i even when the unshared layer L2i is selected by a selection instruction.

The information processing device 10Di can select which of the shared layer L1i and the unshared layer L2i is used to accept a drawing at an overlapping part within the screen SCi between the shared layer L1i and the unshared layer L2i. For example, in response to an operation on the operation unit 110 by the user, the information processing device 10Di can accept, on the shared layer L1i, a drawing at the overlapping part within the screen SCi between the shared layer L1i and the unshared layer L2i. In this case, a drawing on the shared layer L1i can be executed at the overlapping part within the screen SCi between the shared layer L1i and the unshared layer L2i.

As described above, the fifth embodiment can achieve an effect similar to that of the first embodiment and the second embodiment. Also, in the fifth embodiment, the information processing device 10Di accepts a selection instruction to select which of the shared layer L1i and the unshared layer L2i is used to accept a drawing at an overlapping part within the screen SCi between the shared layer L1i and the unshared layer L2i. Based on the selection instruction, the information processing device 10Di accepts a drawing at the overlapping part, on one of the shared layer L1i and the unshared layer L2i. Therefore, by selecting the shared layer L1i in response to a selection instruction, the information processing device 10Di can accept a drawing on the shared layer L1i even at the overlapping part within the screen SCi between the shared layer L1i and the unshared layer L2i.

MODIFICATION EXAMPLES

The first to fifth embodiments can be modified in various manners. Specific modifications will now be described. Two or more of the following modifications that are arbitrarily selected can be combined together according to need, unless these modifications contradict each other.

Modification Example 1

In the first embodiment, one of the plurality of information processing devices 10 may function as a server. In this case, for example, when a drawing is executed on the shared layer L1, the information processing device 10 other than the information processing device 10 functioning as a server, of the plurality of information processing devices 10, transfers the first object OBJ1 generated by the drawing, to the information processing device 10 functioning as a server. The information processing device 10 functioning as a server transfers the first object OBJ1 generated by the drawing on the shared layer L1, to each information processing device 10. Consequently, common image information is stored in the shared image memory 121 of each information processing device 10.

Similarly, in the second embodiment, one of the plurality of information processing devices 10A may function as a server. Also, in the third embodiment, one of the plurality of information processing devices 10B may function as a server. In the fourth embodiment, one of the plurality of information processing devices 10C may function as a server. In the fifth embodiment, one of the plurality of information processing devices 10D may function as a server. Modification example 1 can achieve an effect similar to the effect of each of the first to fifth embodiments.

Modification Example 2

In each of the first, second, and the fifth embodiments, the display control unit 192 may have the function of the display control unit 192B in FIG. 8 and the function of the display control unit 192C in FIG. 10. For example, the display control unit 192 of the information processing device 10i may have the function of displaying, on the screen SCi, an object to identify the range prescribed by the unshared layer L2j of the information processing device 10j, and the function of showing or hiding the first object OBJ1, based on a first display instruction, and showing or hiding the second object OBJ2i, based on a second display instruction. Modification example 2 can achieve an effect similar to the effect of each of the first to fifth embodiments.

Modification Example 3

In the second embodiment, the copy control unit 196 may accept a shift instruction to shift the second object OBJ2i included in the unshared layer L2i to the shared layer L1i. For example, on accepting a shift instruction, the copy control unit 196 of the information processing device 10Ai shifts the second object OBJ2*i* designated by the shift instruction to the shared layer L1*i*. Consequently, the display control unit 192 of the information processing device 10Ai displays the second object OBJ2*i* shifted to the shared layer L1*i*, at the position within the screen SCi prescribed by the shared layer L1*i*. The display control unit 192 of the information processing device 10Ai also transmits the second object OBJ2*i* shifted to the shared layer L1*i*, to the information processing device 10Aj. Consequently, the second object OBJ2*i* is drawn on the shared layer L1*j* of the information processing device 10Aj and displayed at the position within the screen SCj prescribed by the shared layer L1*j*. Modification example 3 can achieve an effect similar to the effect of each of the second embodiment.

Modification Example 4

In each of the third to fifth embodiments, the function of the copy control unit 196 may be omitted from each of the information processing devices 10B, 10C, and 10D. Modification example 4 can achieve an effect similar to the effect of each of the third to fifth embodiments.

Modification Example 5

In the fifth embodiment, the display control unit 192 may have the function of the display control unit 192B in FIG. 8 or the function of the display control unit 192C in FIG. 10. Also, the function of the copy control unit 196 may be omitted from the information processing device 10D. Modification example 5 can achieve an effect similar to the effect of the third and fifth embodiments, or an effect similar to the effect of the fourth and fifth embodiments.

Modification Example 6

In the fifth embodiment, the function of the copy control unit 196 may be omitted from the information processing device 10D, and the display control unit 192 may have the function of the display control unit 192B in FIG. 8 and the function of the display control unit 192C in FIG. 10. Modification example 6 can achieve an effect similar to the effect of each of the third to fifth embodiments.

Modification Example 7

All or a part of the elements implemented by the control unit 190 reading and executing the program may be implemented by hardware such as an electronic circuit, for example, an FPGA (field-programmable gate array) or ASIC (application-specific IC) or the like, or may be implemented by a collaboration of software and hardware.

Modification Example 8

In each of the first to fifth embodiments and each of modification examples 1 to 7, each of the information processing devices 10, 10A, 10B, 10C, and 10D is not limited to a computer. For example, each of the information processing devices 10, 10A, 10B, 10C, and 10D may be a direct-view liquid crystal display or plasma display.

What is claimed is:

1. An image sharing method for sharing an image between a first information processing device and a second information processing device, the method comprising:

when a first drawing is executed on a shared layer shared with the second information processing device, causing the first information processing device to transmit a first object generated by the first drawing to the second information processing device and to display the first object at a position within a screen prescribed by the shared layer;

when a second drawing is executed on an unshared layer not shared with the second information processing device, causing the first information processing device not to transmit a second object generated by the second drawing to the second information processing device and to display the second object at a position within the screen prescribed by the unshared layer; and causing the first information processing device to variably control one of a size and a position within the screen of the unshared layer, or both of the size and the position within the screen of the unshared layer, wherein when accepting a copy instruction to copy the second object included in the unshared layer to the shared layer, the first information processing device copies the second object designated by the copy instruction from the shared layer, pastes the copied second object to the shared layer and transmits the pasted second object in the shared layer to the second information processing device.

2. The image sharing method according to claim 1, wherein the first information processing device displays, on the screen, an object to identify a range prescribed by a layer not shared with the first information processing device in the second information processing device.

3. The image sharing method according to claim 1, wherein when accepting a first display instruction to select to show or hide the shared layer, the first information processing device shows or hides the first object, based on the first display instruction, and when accepting a second display instruction to select to show or hide the unshared layer, the first information processing device shows or hides the second object, based on the second display instruction.

4. The image sharing method according to claim 1, wherein when accepting a selection instruction to select which of the shared layer and the unshared layer is used to accept a drawing at an overlapping part within the screen between the shared layer and the unshared layer, the first information processing device accepts a drawing at the overlapping part on one of the shared layer and the unshared layer, based on the selection instruction.

5. An information processing device comprising:

a display control unit which, when a first drawing is executed on a shared layer shared with another information processing device, transmits a first object generated by the first drawing to the another information processing device and displays the first object at a position within a screen prescribed by the shared layer, and which, when a second drawing is executed on an unshared layer not shared with the another information processing device, does not transmit a second object generated by the second drawing to the another information processing device and displays the second object at a position within the screen prescribed by the unshared layer;

an arrangement control unit variably controlling one of a size and a position within the screen of the unshared layer, or both of the size and the position within the screen of the unshared layer; and a copy control unit which, when accepting a copy instruction to copy the second object included in the unshared layer to the shared layer, copies the second object designated by the copy instruction from the shared layer, and pastes the copied second object to the shared layer, wherein the display control unit transmits the pasted second object in the shared layer to the another information processing device.

6. The information processing device according to claim 5, wherein the display control unit displays, on the screen, an object to identify a range prescribed by a layer not shared with the information processing device itself in the another information processing device.

7. The information processing device according to claim 5, wherein when accepting a first display instruction to select to show or hide the shared layer, the display control unit shows or hides the first object, based on the first display instruction, and when accepting a second display instruction to select to show or hide the unshared layer, the display control unit shows or hides the second object, based on the second display instruction.

8. The information processing device according to claim 5, further comprising a drawing control unit which, when accepting a selection instruction to select which of the shared layer and the unshared layer is used to accept a drawing at an overlapping part within the screen between the shared layer and the unshared layer, accepts a drawing at the overlapping part on one of the shared layer and the unshared layer, based on the selection instruction.

9. An information processing system for sharing an image between a first information processing device and a second information processing device, wherein when a first drawing is executed on a shared layer shared with the second information processing device, the first information processing device transmits a first object generated by the first drawing to the second information processing device and displays the first object at a position within a screen prescribed by the shared layer, when a second drawing is executed on an unshared layer not shared with the second information processing device, the first information processing device does not transmit a second object generated by the second drawing to the second information processing device and displays the second object at a position within the screen prescribed by the unshared layer, and the first information processing device variably controls one of a size and a position within the screen of the unshared layer, or both of the size and the position within the screen of the unshared layer, wherein when accepting a copy instruction to copy the second object included in the unshared layer to the shared layer, the first information processing device copies the second object designated by the copy instruction from the shared layer, pastes the copied second object to the shared layer and transmits the pasted second object in the shared layer to the second information processing device.

10. The information processing system according to claim 9, wherein the first information processing device displays, on the screen, an object to identify a range prescribed by a layer not shared with the first information processing device in the second information processing device.

11. The information processing system according to claim 9, wherein when accepting a first display instruction to select to show or hide the shared layer, the first information processing device shows or hides the first object, based on the first display instruction, and when accepting a second display instruction to select to show or hide the unshared layer, the first information processing device shows or hides the second object, based on the second display instruction.

12. The information processing system according to claim 9, wherein when accepting a selection instruction to select which of the shared layer and the unshared layer is used to accept a drawing at an overlapping part within the screen between the shared layer and the unshared layer, the first information processing device accepts a drawing at the overlapping part on one of the shared layer and the unshared layer, based on the selection instruction.

* * * * *